(12) United States Patent
Zorzin

(10) Patent No.: US 10,303,769 B2
(45) Date of Patent: May 28, 2019

(54) METHOD FOR AUTOMATICALLY DETECTING MEANING AND MEASURING THE UNIVOCALITY OF TEXT

(71) Applicant: Somol Zorzin GmbH, Steisslingen (DE)

(72) Inventor: Luciano Zorzin, Steisslingen (DE)

(73) Assignee: Somol Zorzin GmbH, Steisslingen (DE)

( * ) Notice: Subject to any disclaimer, the term of this patent is extended or adjusted under 35 U.S.C. 154(b) by 0 days.

(21) Appl. No.: 15/114,607

(22) PCT Filed: Jul. 29, 2014

(86) PCT No.: PCT/EP2014/002111

§ 371 (c)(1),
(2) Date: Jul. 27, 2016

(87) PCT Pub. No.: WO2015/113578

PCT Pub. Date: Aug. 6, 2015

(65) Prior Publication Data

US 2016/0357731 A1 Dec. 8, 2016

(30) Foreign Application Priority Data

Jan. 28, 2014 (DE) ........................ 10 2014 001 119

(51) Int. Cl.
*G06F 17/27* (2006.01)
*G06F 17/28* (2006.01)

(52) U.S. Cl.
CPC ........ *G06F 17/2785* (2013.01); *G06F 17/273* (2013.01); *G06F 17/2755* (2013.01); *G06F 17/2881* (2013.01)

(58) Field of Classification Search
CPC ....... G06F 17/27; G06F 17/28; G06F 17/2785
See application file for complete search history.

(56) References Cited

U.S. PATENT DOCUMENTS

| | | | |
|---|---|---|---|
| 5,764,856 | A | 6/1998 | Jaenecke |
| 7,184,948 | B2 | 2/2007 | Chalabi |
| 8,190,423 | B2 | 5/2012 | Rehberg et al. |

(Continued)

FOREIGN PATENT DOCUMENTS

| | | |
|---|---|---|
| EP | 0643353 B1 | 7/1999 |

OTHER PUBLICATIONS

Tat, et al ("Primitive-Based Word Sense Disambiguation for SENSEVAL-2" SENSEVAL 01 Proceeding of Second International Workshop on Evaluating Word Sense Disambiguation System, Jan. 1, 2001, pp. 103-106). Listed in IDS.*

(Continued)

*Primary Examiner* — Pierre Louis Desir
*Assistant Examiner* — Yi Sheng Wang
(74) *Attorney, Agent, or Firm* — The Webb Law Firm

(57) ABSTRACT

The invention relates to a method for automatically detecting meaning patterns in a text using a plurality of input words, in particular a text with at least one sentence, comprising a database system containing words of a language, a plurality of defined categories of meaning in order to describe the properties of the words, and meaning signals for all the words stored in the database, wherein a meaning signal is a clear numerical characterization of the meaning of the words using the categories of meaning.

28 Claims, 9 Drawing Sheets

Simplified flow diagram which compares - in purely formal terms - the process of spell-checking (A) with the new meaning-checking (B).

(56) References Cited

U.S. PATENT DOCUMENTS

| | | | | |
|---|---|---|---|---|
| 8,260,605 | B2 | 9/2012 | Chen et al. | |
| 8,548,795 | B2 | 10/2013 | Anisimovich et al. | |
| 2012/0123765 | A1 * | 5/2012 | Estelle | G06F 17/277 704/3 |
| 2013/0197900 | A1 | 8/2013 | Rotbart et al. | |
| 2014/0019443 | A1 * | 1/2014 | Golshan | G06F 17/30867 707/723 |
| 2014/0067731 | A1 * | 3/2014 | Adams | G06N 99/005 706/12 |

OTHER PUBLICATIONS

Ide et al ("Introduction to the special issue on word sense disambiguation: the State of the art", Computational Linguistics, MIT Press, US vol. 24 No. 1, Mar. 1, 1998).Listed in IDS.*

Tat, et al "Primitive-Based Word Sense Disambiguation for SENSEVAL-2" SENSEVAL 01 Proceeding pf Second International Workshop on Evaluating Word Sense Disambiguation System, Jan. 2001 pp. 103-106.*

Ide et al "Introduction to the special issue on word sense disambiguation: the State of the art", Computational Linguistics, MIT Press , US vol. 24 No. 1, Mar. 1, 1998.*

Cowie, Jim, et al.; "Lexical Disambiguaton using Simulated Annealing"; Proceedings of the Workshop on Speech and Natural Language, 1992, pp. 238-242, vol. 242, Morristown, NJ, USA.

Ide, Nancy, et al.; "Introduction to the Special Issue on Word Sense Disambiguation: The State of the Art"; Computational Linguistics, 1998; pp. 2-40, vol. 24, No. 1, MIT Press, US.

Tat, Lim Beng, et al.; "Primitive-Based Word Sense Disambiguation for SENSEVAL-2"; SENSEVAL '01 The Proceedings of the Second International Workshop on Evaluating Word Sense Disambiguation Systems, 2001, pp. 103-106.

* cited by examiner

Figure 1: Simplified flow diagram which compares - in purely formal terms - the process of spell-checking (A) with the new meaning-checking (B).
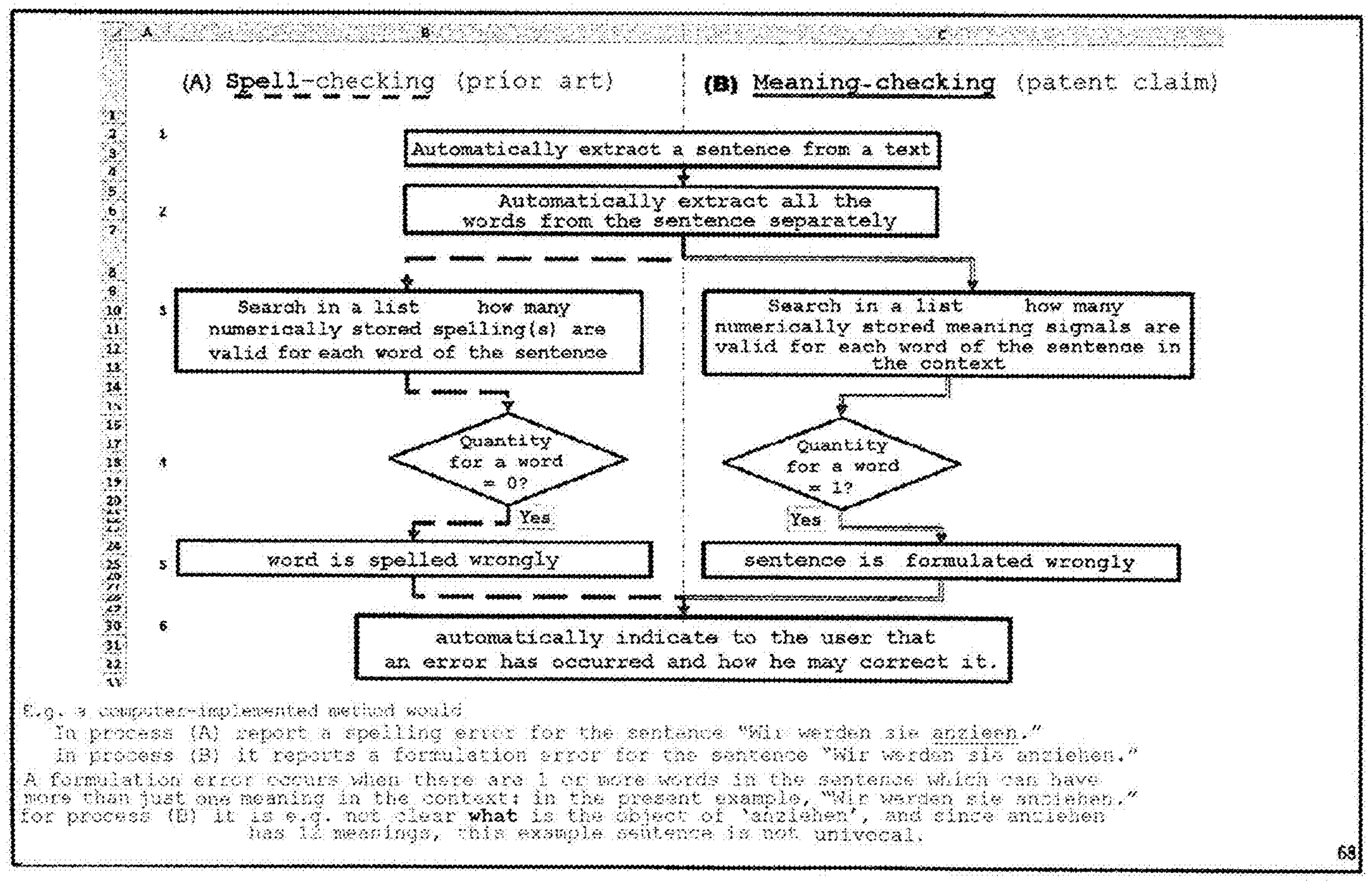

Figure 2: Overview of automatic "Meaning-Checking" in a highly simplified form, with examples of its application in a: [A] machine translation system [B] speech recognition engine.
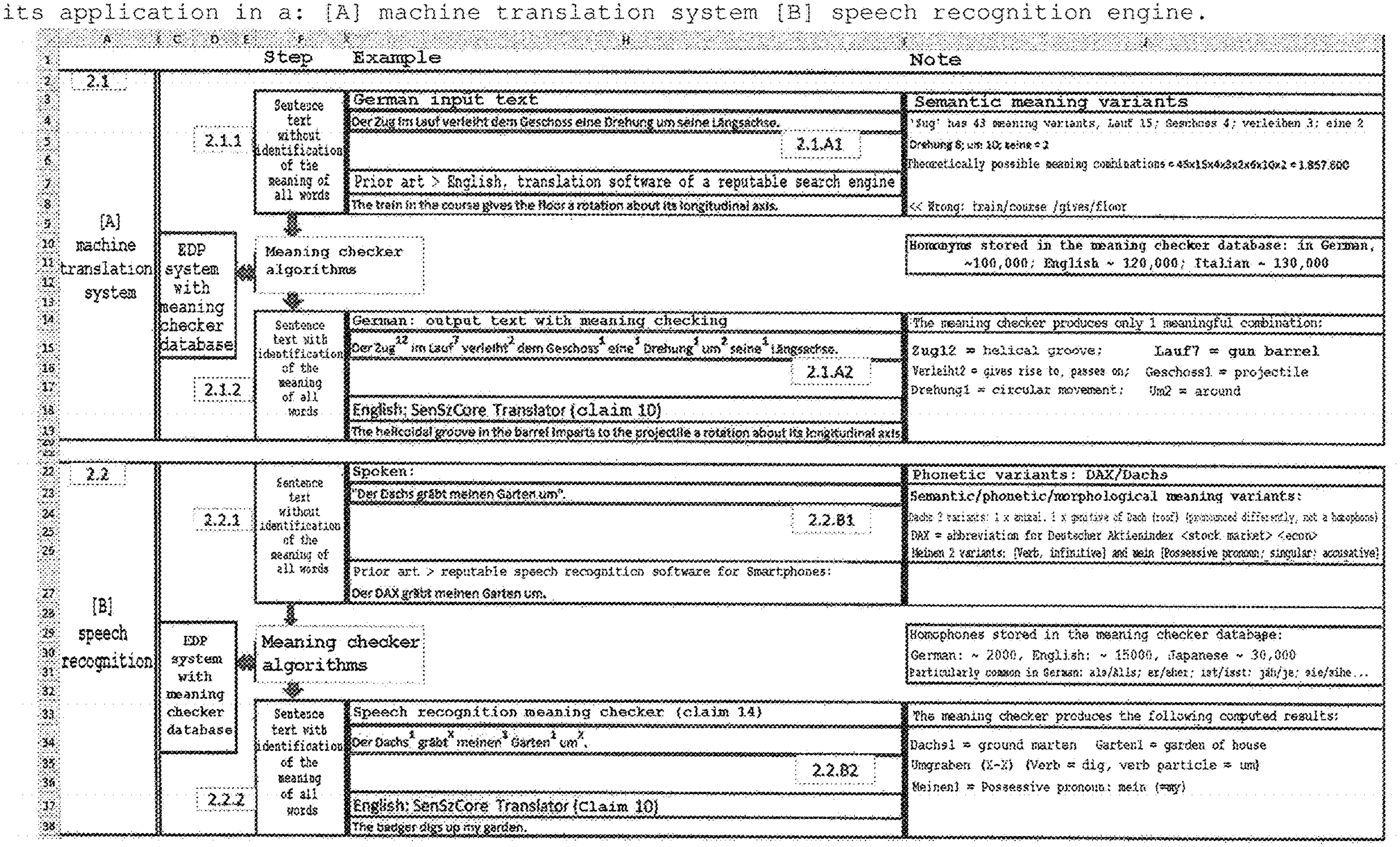

Figure 3.1: Overview of the structure and content layout of meaning-signals (in each case columns C–L in rows 9 to 42). For explanations on the table layout, see Section 3.2

| | A | B | C | D | E | F | G | H | I | J | K | L | M |
|---|---|---|---|---|---|---|---|---|---|---|---|---|---|
| 1 | | | | Thing | Pen, pencil | Stift 1 | Stift 2 | Stift 3 | Stift 4.1 | Stift 4.2 | schreiben 1 | schreiben 2 | schreiben 3 |
| 2 | | | Word type | s.n\m\f | s.m. | s.m | s.m | s.m | s.n | s.n | v.tra/intr | v.tra/intr | v.tra/intr |
| 3 | | | Brief description | | <Graf,wz> | <Graf,wz> | <mech> | <region> <aab> | <building> <austr><rel> | <institution> <austr><rel> | | | |
| 4 | | | Word-reference meaning | | | (for writing) | (for fixing) | | | | (motor-based activity) | (compose opus) | (function) |
| 5 | | | >>Synonym/<< Hypernym | | << Stift 1 | >> Pen, pencil | >> machine pen | >> apprentice | >> abbey | >> abbey | >> coll. scribble | >> compose | >> function |
| 6 | | | Constraint references (CR) | | N = write 1, paint 2 | N = write 1, paint 2 | V = mount 2, mounting | K = school 9, student 1, industry 2, trade 5 ... | N = reside 3, H = build 2 | K = Curia 1, church 2, ... | F = paper 1, regular surface 2, keyboard 3, select 4, | O = book 2-5, text 1-3, | G = Stift 1, plotter, printer 5 |
| 7 | 1 | Meaning-signal category 2 | Meaning-signal category 4 \ occupied fields \(CR)> | 0 | 88\49 | 88\49 | 59\19 | 220\60 | 94/22 | 89\1 | 86\3 | 84\0 | 38\3 |
| 8 | | | ... | | | | | | | | | | |
| 9 | matter | Production/Usage/Storage> | Property | 0 | 1 | 1 | 0 | 0 | 1 | 1 | 0 | 0 | 0 |
| 10 | matter | Production/Usage/Storage> | requires tool (action)/is a tool (object) | 0 | 1N | 1N | 1V | 0 | 1H | 0 | 0 | 0 | 1G |
| 11 | matter | Production/Usage/Storage> Functional effect when used | if a material, storage, aids storage | 0 | 1 | 1 | 0 | 0 | 1 | 0 | 0 | 0 | 0 |
| 12 | | | ... | | | | | | | | | | |
| 13 | matter | general function PURPOSE of devices\machines\systems\buildings\ structures> material> | storing | 0 | 1 | 1 | 0 | 0 | 1 | 0 | 1 | 0 | 0 |
| 14 | matter | general function PURPOSE of devices\machines\systems\buildings\ structures> material> | guide | 0 | 1N | 1N | 0 | 0 | 0 | 0 | 1 | 0 | 1 |
| 15 | matter | general function PURPOSE of devices\machines\systems\buildings\ structures> material> | join\connect | 0 | 1N | 1N | 0 | 0 | 0 | 0 | 0 | 0 | 1 |
| 16 | | | ... | | | | | | | | | | |

Figure 3.1 (cont.): Overview of the structure and content layout of meaning-signals (in each case columns C–L in rows 9 to 42). For explanations on the table layout, see Section 3.2

| | | | | | | | | | | | | | |
|---|---|---|---|---|---|---|---|---|---|---|---|---|---|
| 17 | matter | Structure also functional> macro properties> | Density relative to water (heavier, lighter) | 0 | 3 | 3 | 3 | 3 | 3 | 0 | 0 | 0 | 0 |
| 18 | matter | Structure also functional> macro properties> | Hardness (chewable, hard as stone) | 0 | 2 | 2 | 3 | 2 | 3 | 0 | 0 | 0 | 0 |
| 19 | matter | Structure also functional> macro properties> | Object | 0 | 1 | 1 | 1 | 0 | 1 | 0 | 0 | 0 | 0 |
| 20 | matter | Structure also functional> macro properties> | Whole functional unit (combination of sub-units) | 0 | 1 | 1 | 0 | 1 | 3 | 0 | 0 | 0 | 0 |
| 21 | | | ... | | | | | | | | | | |
| 22 | matter | Structure also functional> micro properties> | solid/fixed | 0 | 1 | 1 | 1 | 1 | 3 | 0 | 1 | 0 | 0 |
| 23 | | | ... | | | | | | | | | | |
| 24 | matter | Form, emanations, interaction> dimension/measurements/weight> | hand (1 deci, 10^3 g) | 0 | 1 | 1 | 1 | 0 | -1 | -1 | 0 | 0 | 1 |
| 25 | matter | Form, emanations, interaction> dimension/measurements/weight> | defined form by standard\production process | 0 | 1 | 1 | 1 | 0 | 1 | 0 | 0 | 0 | 0 |
| 26 | | | ... | | | | | | | | | | |
| 27 | matter | Form, emanations, interaction> Surface> | Regularity | 0 | 3F | 3F | 1 | 0 | 1 | 0 | 1F | 0 | 0 |
| 28 | | | ... | | | | | | | | | | |
| 29 | matter | Form, emanations, interaction> Relevant emission of materials\Signals to | consumable material itself, or function-related material emission | 0 | 1N | 1N | 0 | 0 | 1N | 0 | 0 | -1 | 1 |
| 30 | | | ... | | | | | | | | | | |
| 31 | information | Place=head > Senses, remote senses, near senses | 3D vision (form) | 0 | 1 | 1 | 1 | 1 | 1 | -1 | 0 | 0 | 0 |
| 32 | | | ... | | | | | | | | | | |
| 33 | information | Place=head> Learning, experience> | Food / non-food fhR | 0 | -1 | -1 | 0 | 1 | -1 | 0 | 0 | 1 | 0 |
| 34 | information | Place=head> Learning, experience> | USAGE: advantage/disadvantage fhR | 0 | 1 | 1 | | 2 | 1 | 0 | 1 | 1 | 0 |
| 35 | | | ... | | | | | | | | | | |
| 36 | trigger | Typical trigger> | Human will (existence\occurrence) | 0 | 1 | 1 | 1 | 2 | 1 | 1 | 1 | 1 | 1 |

Figure 3.1 (cont.): Overview of the structure and content layout of meaning-signals (in each case columns C-L in rows 9 to 42). For explanations on the table layout, see Section 3.2

| | | | | | | | | | | | | | |
|---|---|---|---|---|---|---|---|---|---|---|---|---|---|
| 37 | trigger | Typical trigger> | has/requires acquired knowledge 1=Basic knowledge | 0 | 1N | 1N | 1V | 1 | 1H | 0 | 1 | 2 | 1 |
| 38 | trigger | Typical trigger> | is animate/inanimate | 0 | 1 | 1 | -1 | 2 | -1 | (1) | 1 | 1 | (1) |
| 39 | trigger | Typical trigger> | is human (event) | 0 | 1 | 1 | 0 | 2 | 1H | 0 | 1 | 1 | 1 |
| 40 | | | ... | | | | | | | | | | |
| 41 | processes | Typical process> Duration absolute> | long 1...10 years | 0 | 1 | 1 | 1 | 2 | 1H | 1 | 0 | 0 | 0 |
| 42 | processes | Typical process> Duration absolute> | long, generation 20...40 years | 0 | -1 | -1 | 1 | 1 | 1 | 1 | 0 | 0 | 0 |

Figure 3.2: Typical value comparison matrix for comparing meaning-signals of a sentence: "Der Stift schreibt nicht. " (The pen does not write./The little nipper does not author./The apprentice does not author.)

SSIM

Meaning signal intersection matrix

| # | Homonym info (incl. PSC#) | 1 schreiben 1 (motor-based activity) tr/intr: write down, scribble ... | 2 schreiben 2 (create readable work >> author) tr/intr | 3 schreiben 3 (function of a writing device) tr/intr | 4 schreiben 4 (activity) prnl 'be written' (interact m=hum) | 6 Stift 1 (for writing) <graf> felt pen, pencil ... | 7 Stift 2 (machine pin) <mech> conical pin, cylindrical pin, helical pin | 8 Stift 3 (apprentice) <region><scol><aab> trainee, apprentice, ... | 9 Stift 4.1 (neut.) >> abbey <building><austr><rel> | 10 Stift 4.2 (neut.) >> abbey <institution><austr><rel> | 11 Stift 5 <scherz><vezz> nipper, tiddler, brat ... | 12 Stift 6 <zool><entomol> eggs, ... | 13 Stift 7.1 (neut.) <ant> >> boarding school <building><scol> | 14 Stift 7.2 (neut.) <ant> >> boarding school <institution><scol> | 15 Stift 8 (neut.) <ant> >> old age home <building><geront> | 16 Stift 8 (neut.) <ant> >> old age home <institution><geront> | 17 Stift 9 (nail) <fal><calz> nail, ... | 18 Stift 10 (pivot tooth) <dent> pivot tooth, post, ... | 19 Stift 11 (plug element) <elect> plug pin, ... | 20 Stift 12 (contact pin) <el> contact pin, pin, ... |
|---|---|---|---|---|---|---|---|---|---|---|---|---|---|---|---|---|---|---|---|---|
| 1 | schreiben 1 (motor-based activity) tr/intr: write down, scribble. | | | | | XX | XX | 80% | XX | XX | 80% | XX | XX | XX | XX | XX | XX | XX | XX | XX |
| 2 | schreiben 2 (create readable work >> author) tr/intr | | | | | XX | XX | 80% | XX | XX | 80% | XX | XX | XX | XX | XX | XX | XX | XX | XX |
| 3 | schreiben 3 (function of a writing device) tr/intr | | | | | 100% | 30% | XX | XX | XX | XX | XX | XX | XX | XX | XX | 30% | 30% | 30% | 30% |
| 4 | schreiben 4 (activity) prnl 'be written' (interact m=hum) | | | | | | | | | | | | | | | | | | | |
| 6 | Stift 1 (for writing) <graf> felt pen, pencil... | | | | | | | | | | | | | | | | | | | |
| 7 | Stift 2 (machine pin) <mech> conical pin, cylindrical pin, helical pin... | | | | | | | | | | | | | | | | | | | |
| 8 | Stift 3 (apprentice) <region><scol><aab> trainee, apprentice, ... | | | | | | | | | | | | | | | | | | | |
| 9 | Stift 4.1 (neut.) >> abbey <building><austr><rel> | | | | | | | | | | | | | | | | | | | |
| 10 | Stift 4.2 (neut.) >> abbey <institution><austr><rel> | | | | | | | | | | | | | | | | | | | |
| 11 | Stift 5 <scherz><vezz> >> nipper, tiddler, brat... | | | | | | | | | | | | | | | | | | | |
| 12 | Stift 6 <zool><entomol> eggs,... | | | | | | | | | | | | | | | | | | | |
| 13 | Stift 7.1 (neut.) <ant> >> boarding school <building><scol> | | | | | | | | | | | | | | | | | | | |
| 14 | Stift 7.2 (neut.) <ant> >> boarding school <institution><scol> | | | | | | | | | | | | | | | | | | | |
| 15 | Stift 8 (neut.) <ant> >> old age home <building><geront> | | | | | | | | | | | | | | | | | | | |
| 16 | Stift 8 (neut.) <ant> >> old age home <institution><geront> | | | | | | | | | | | | | | | | | | | |
| 17 | Stift 9 (nail) <fal><calz> nail,... | | | | | | | | | | | | | | | | | | | |
| 18 | Stift 10 (pivot tooth) <dent> pivot tooth, post, ... | | | | | | | | | | | | | | | | | | | |
| 19 | Stift 11 (plug element) <elect> plug pin, ... | | | | | | | | | | | | | | | | | | | |
| 20 | Stift 12 (contact pin) <el> contact pin, pin, ... | | | | | | | | | | | | | | | | | | | |

Figure 4: System overview of meaning-checking
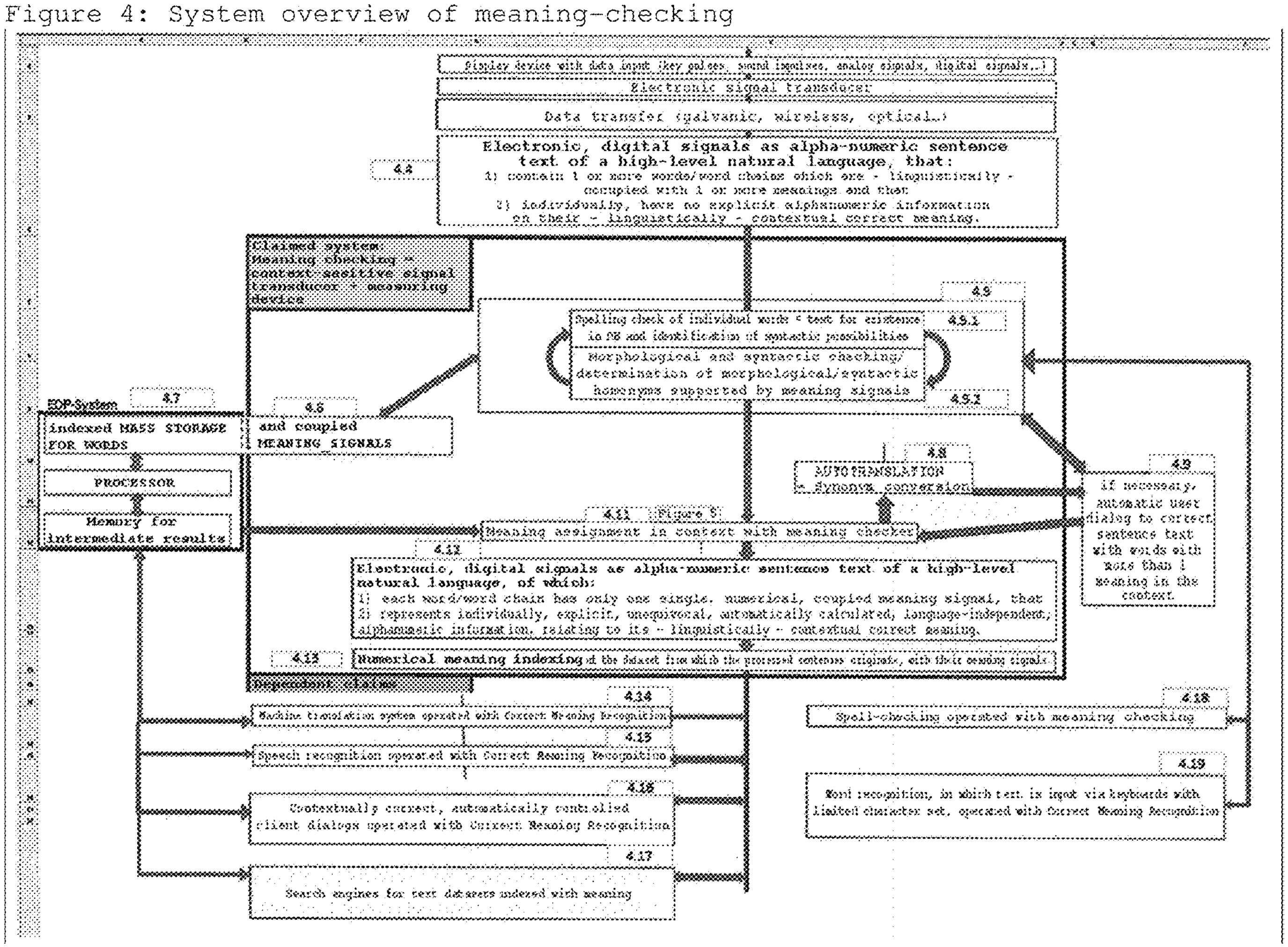

Figure 5: Flow diagram for calculating the meaning scores of words.
Box 4.11 in Figure 4, or partial process in the meaning modulator (2) Figure 6
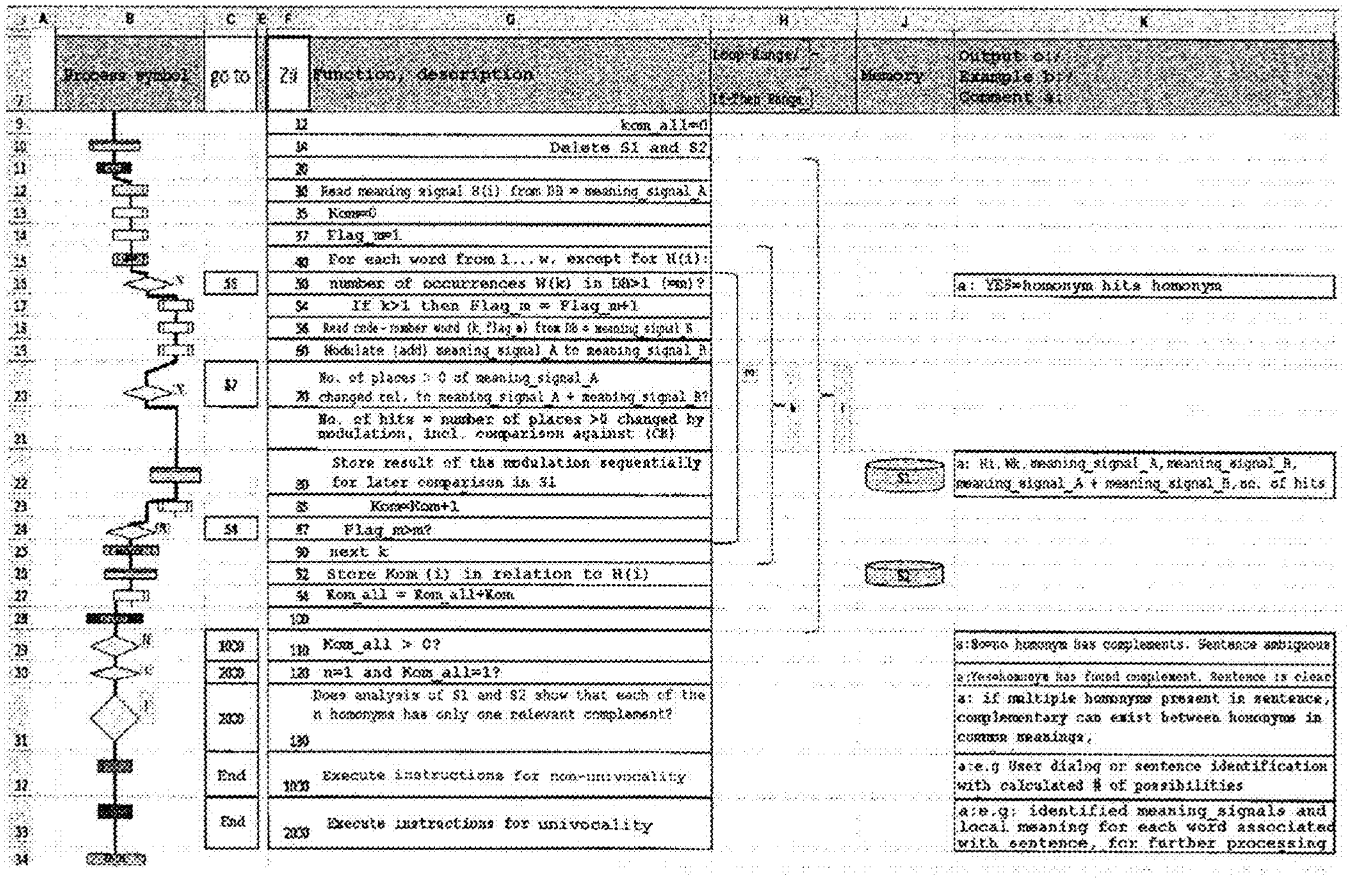

Figure 6: summarized flow diagram of the meaning-checking with numeric references (x) reffering to Section 4.
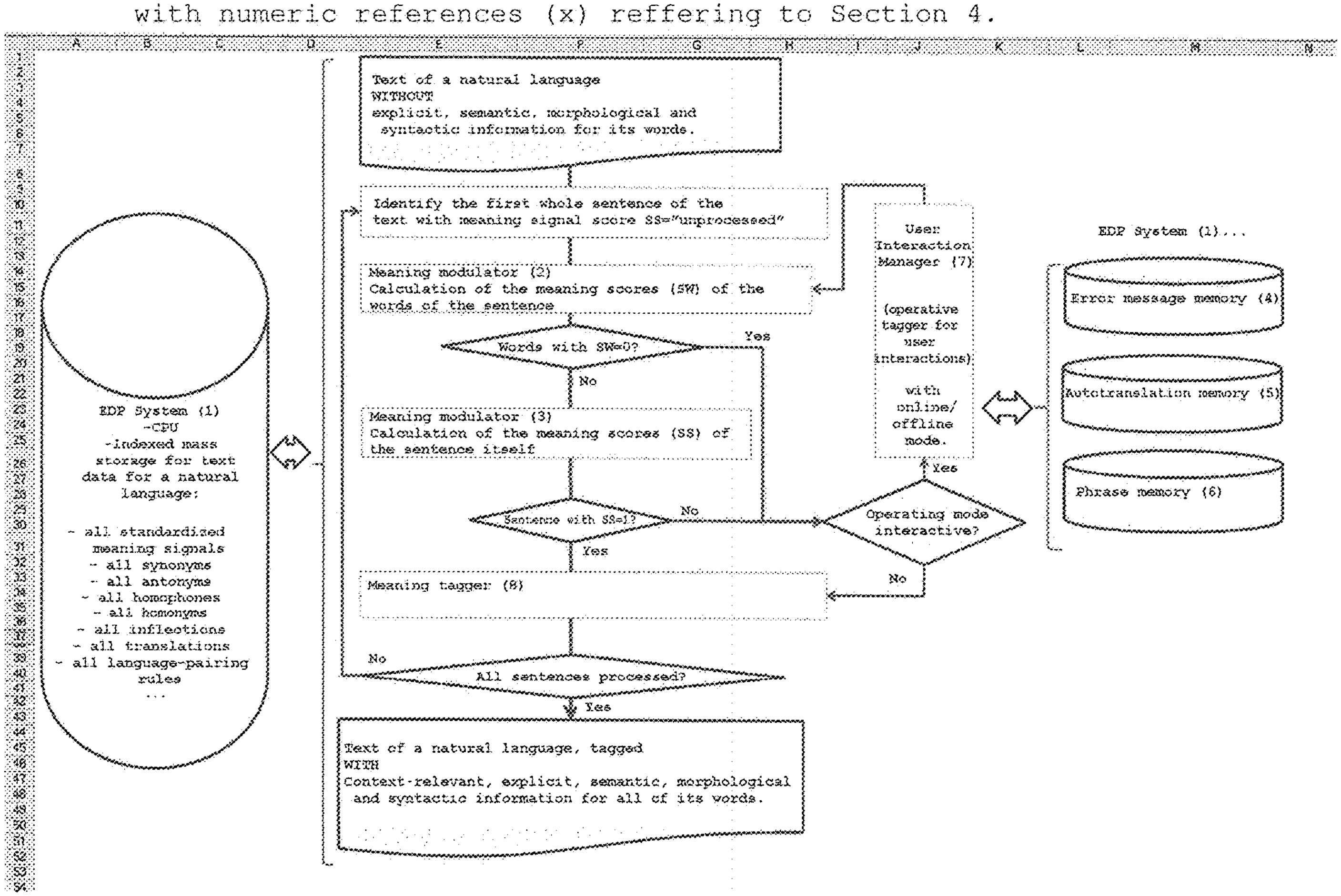

METHOD FOR AUTOMATICALLY DETECTING MEANING AND MEASURING THE UNIVOCALITY OF TEXT

CROSS-REFERENCE TO RELATED APPLICATIONS

This application is the United States national phase of International Application No. PCT/EP2014/002111 filed Jul. 29, 2014, and claims priority to German Patent Application No. 10 2014 001 119.4 filed Jan. 28, 2014, the disclosures of which are hereby incorporated in their entirety by reference.

BACKGROUND OF THE INVENTION

1. General Points 1.1 Summary

The claimed method of the computer-implemented invention "meaning-checking" (literally translated from German: "right-meaning-checking") is: for each sentence of a text of a high-level natural language, to automatically, deterministically determine whether it is univocally formulated, by automatically calculating whether for each word that frames the sentence—computationally—only 1 single, relevant meaning of the word exists in the context and what this meaning is.

The meanings and coupled associations of all relevant words of the high-level natural language in which the sentence is written are stored in special pre-generated, standardized, numeric fields—so-called meaning-signals—and can be retrieved automatically.

In the invention these are automatically, arithmetically combined and comparatively analyzed—controlled only by the input sentence and its context per se—in such a way that as a result of the process either a formulation error is reported—if the sentence is not univocal—or each word is permanently linked to the single, associated meaning-signal which is valid for the word in this context.

This corresponds to the task of extracting information items from the sentence that are not explicitly, but normally only implicitly, present in it.

This implicit information of the sentence, which can be calculated out of the context by the invention, is based on the method according to the invention of the arithmetic and logical combination of the meaning-signals of the words present in the sentence, controlled solely by the special arrangement and morphology of the words in the sentence itself.

Note on Terminology:

Special technical vocabulary and invention specific, novel terms (e.g. meaning-signal, complementary or word ligature), are listed in Table 4. Standard technical terms from linguistics and computational linguistics are listed in Table 7.

1.2 Underlying Procedure 1.2.1 A method for automatically detecting meaning-patterns in a text using a plurality of input words, in particular a text with at least one sentence, comprising a database system containing words of a language, (line 1 in FIG. 3.1), a plurality of pre-defined categories of meaning in order to describe the properties of the words (columns 1-4 in FIG. 3-1, see FIG. 3.1 and explanations thereof in section 3.2), and meaning-signals for all the words stored in the database, wherein a meaning-signal is a univocal numerical characterization of the meaning of the words using the categories of meaning, and wherein at least the following steps are carried out:

a) reading of the text with input words into a device for data processing, b) comparison of all input words with the words in the database system, c) assignment of at least one meaning-signal to each of the input words, wherein in the case of homonyms two or more meaning-signals are assigned;

d) in the event that the assignment of the meaning-signals to the input words is univocal, the meaning-pattern identification is complete, e) in the event that more than one meaning-signal could be assigned to an input word, the relevant meaning-signals are compared with one another in an exclusively context-controlled manner, wherein f) on the basis of the combination of the meaning-signals of the input words among one another, it is determined whether a contradiction or a match—particularly in the case of homonyms—is present in the meaning of the input word with respect to the context;

g) meaning-signal combinations that lead to contradictions are rejected (see FIG. 3.2 and related explanations in section 3.3), meaning-signal combinations for matches are automatically numerically evaluated in accordance with the degree of matching (meaning modulation) based on a pre-defined relevance criterion (see section 3.3) and recorded, h) automatic compilation of all input words resulting from the steps d) and g) are output as the meaning-pattern or the numeric meaning intersection matrix (FIG. 3.2) of the text, in particular of the sentence.

i) in the case of text where words with homophones are present, e.g. from speech recognition and with appropriate triggering, including checking the degree of meaning-signal correspondence, but also morphological-syntactic compatibility of the word that is present and its further homophonous spelling in relation to the context and possibly automatic replacement or error warning in case of insufficient differentiation among the meaning-signals of the words of an identical homophone group in the context of the sentence under test.

1.2.2 Problem Solved

"Meaning-checking" solves the technical problem in the automatic processing of texts that, in particular in the case of words with multiple meanings (=homonyms), is not explicitly present, in which of its meanings the homonym has actually been used in the text by the author of the sentence.

In spoken texts "meaning-checking" solves the same problem as for homonyms also for homophones. For homophones, the spelling of the word used is not determined when hearing a text.

Examples of homophonous words: Lehre—Leere (teaching—empty); or DAX—Dachs (DAX—badger); also, especially in German, in upper and lower case (e.g. wagen (be brave)—Wagen (car, vehicle); wegen (because of)—Wegen (ways, dative/plural of way);

in English, for example, to—two—too; or knew—new—gnu.

But also word ligatures (not compounds): e.g. "an die" (to the)—"Andy";

or for example in Spanish "del fin" (i.e "from the end")—"delfin" (dolphin).

The number of homophonous words (not counting common word ligatures) is e.g.: in German about 8,000 words, in English about 15,000 words, in French 20,000 words, in Japanese approx. 30,000 words).

This information of a sentence which is not explicit, e.g. with respect to the homonyms and homophones—but which is implicitly present in any univocal sentence of a natural language due to the combination of the words used themselves, in sentence and context—has up to now only been possible to be determined by human beings who master the language in which the sentence was created (be it phonetically or alphanumerically).

Homonyms and homophones belong to the most frequently used words in all languages. E.g. in German, of the 2000 most frequently used words about 80% are homonyms and approx. 15% homophones. In other high-level languages these values are sometimes much larger.

If one wants e.g. to discern the meaning of each word of a sentence in a completely unknown language, for each word of the sentence one must look up its meanings in its basic form—e.g. by means of a dictionary—and then—in the unknown language—determine which of the meanings was likely intended by the author of the sentence in the context of the other words of the sentence.

This is all the more difficult the more homonyms the sentence contains.

In the case of sentences with 5 or 8 words it is already common for hundreds, or even thousands, of basic possible combinations of the meaning of the words of a sentence to exist, although only one of the possible combinations is correct in the context. See for example in FIG. 2 the sentences 2.1.A1 and 2.1.A2.

In sentence 2.1.A2 after the application of the invention, the meaning of each word is identified and can be recognized by superscripts on the respective word. (See individual meanings in the box to the right) This sentence from FIG. 2 is univocal, although nearly 2 million basic possible meaning combinations of the meanings of its words exist for it. Refer to the information given in the fields J4-J6, and J15-J17 in FIG. 2. More detailed information on other meanings of the homonyms of this example is given in Table 1.

This problem—to determine the basic form, the possible semantic variants, and to calculate the correct meaning combination of a word in any given sentence and context—for all words stored in the databases linked to the invention with meaning-signals, is solved automatically by the invention.

And in fact this is done solely by automatic analysis and numerical comparison of the meaning-signals of the input text (sentence+sentence context) itself and without needing to analyze any other text databases, corpora, lexica etc.; neither statistically, nor by graph-based methods (e.g. calculation of edge lengths in Euclidean vector spaces), nor by means of artificial neural networks etc.

Here it is important to speak about meaning-signals because the selected structure and arithmetics for computational treatment of meaning-signals corresponds to the computer-based treatment of numeric patterns, in contrast to a rather neurological term like "associations".

Meaning-signals do represent associations on a numerical way, but they are not themselves associations.

It is the analogy of the process of mutual modulation of meaning-signals from the field of communications technology, as well as the existence of electrical "currents" in the brain during the processing of associations when language is perceived by human beings, which recommend the use of the new expression "meaning-signals".

1.3 Technical Applications/Comparison to the Prior Art

A direct, practical application of the invention, beyond meaning-checking, are e.g.:

High quality automatic machine translation systems, because:

Firstly, only univocal sentences can be translated correctly. Secondly, an univocal sentence can only be assigned correct translations, if the—only—relevant meaning of each individual word of the sentence in the context is known. The perceived state-of-the-art based on well-known products—regardless of whether they are free of charge or not—=50% incorrect translations, e.g. in the case of statistical machine translation engines. The database to be searched in the invention is nevertheless smaller by a factor of 500 . . . 1000 than those based on conventional statistics machine translation systems, while increasing the translation quality to better than 95%. (cf. Tables 5+6)

The knowledge of the relevant unique meaning of each word in the context allows, among other things, a novel, automatic, semantic indexing of text databases according to meaning, which then allows very much more accurate search results from search engines (a factor of 99% to 99.99% fewer irrelevant hits), than the prior art. Perceived state-of-the-art technology based on well-known products=if the search term is a homonym, the hits for all meanings of the word are displayed and not only those for the single intended meaning.

In addition, for speech recognition or human-machine dialogs this knowledge of the relevant unique meaning of each word in the context allows a precise—meaning-related—recognition and further processing of the input—also in the form of automatically generated input-related, rationally intelligible, interactive dialogs—which have not existed up to now.

Perceived state-of-the-art technology based on well-known products=100% erroneous interpretation of homophones, and no reliable detection of words that are important for logical inferences. See also example 2.2 sentences 2.2.B1 and 2.2.B2.

SUMMARY OF THE INVENTION 1.4 Summary of Description

The computer-implemented procedure of the invention may be compared in a purely formal way to that of a spell-checker. The abstracted flow diagram of the (new) meaning-checking (B) is very similar to that of the (known) automatic spell-checker (A). FIG. 1

(B)—the invention—is based on a novel numerical type of processing that allows the relevance of all possible associations of a word to its context, stored in meaning-signals, to be automatically calculated.

Meaning-signals are the data underlying each individual word and each of its different meanings. Meaning-signals are fixed and are multi-dimensional numerical fields which can be compared with each other numerically and logically. In the invention meaning-signals are defined for all relevant words of a high-level language and are automatically retrievable—FIG. 4.7.

A meaning-signal of a word becomes "valid" in the context (FIG. 1, Box in line 3, right), if it has only one meaning-signal—either because it has only a single meaning, or because the meaning-signal of at least one other word in the context has multiple matches with it, in fact significantly more, than other words in the context. Words which "validate" each other in terms of their meaning are called "complementaries" in the context of the invention. (Detailed definition is given at the beginning of Section 2)

Words of any sentence can have more than 1 association in the context, because:

In all languages there are tens of thousands of words (e.g. German about 35,000, in English about 50,000), which have exactly the same spelling but several different meanings (called homonyms): E.g. in German Lauf [13 meanings], Zug [43], Geschoss [4], anziehen [12].

Homonyms are particularly frequently used in all languages in comparison to non-homonyms.

Also, sentence particles are usually homonyms which have multiple, usually position-dependent meanings and syntactic functions, depending on the word or phrase to which they are assigned.

For sentence particles alone there are thus a total of approximately 5,300 homonyms, if adverbs are included (they are non-inflecting words in terms of their function).

Almost every sentence of text from a natural language contains homonyms. The purely lexical[7] analysis options of the prior art of EDP—in practice equal to a Gutenberg typecase with 255 ASCII characters—are therefore seriously inadequate for the task of processing words by their meaning in a text.

This applies to all spoken, high-level natural languages.

The meaning which is assigned to a homonym by the author of a text is determined by the context in which the homonym occurs, it cannot be obtained explicitly from the text itself.

Only after the application of the meaning-checking (B) is it known (in FIG. 2 conversion of text 2.1.A1 into the indexed form 2.1.A2), whether and which meaning of each homonym has a relevant meaning in the sentence context.

This property of natural languages—that the univocal meaning of the words used with multiple meanings cannot be explicitly extracted from the text itself, but can only be associated implicitly to the context by language knowledge—internationally has no generally valid definition in linguistics.

Within the discipline of sentence semantics, this property is circumscribed in the broadest sense, using terms such as "equivocation[7]", "homonymy[7]", "ambiguity[7]" and "polysemy[7]". In the prior art the terms "word-sense disambiguation" or "reduction of ambiguity" are commonly used. But it is formally, logically incorrect or very misleading, to say that a word can be "disambiguated" or that the "ambiguity of a sentence" can be reduced, because:

A word in a sentence or a sentence are univocal or they are not. This can only be eliminated by the author of the sentence and the context of the sentence.

That is, the non-univocality of a sentence can only (a) be determined by a human being, or (b) calculated automatically with appropriate methods (the claimed invention).

In the following text therefore the entire, new, claimed method that is capable, in spite of the "equivocation", "homonymy", "non-univocality" and "polysemy" ever-present in natural language, of calculating the number of meanings used of all words in a sentence and which ones, is given the following name: "Determination of the implicit meaning of a sentence, by calculating the complementary, associable, semantic relations between its words".

In English, Abbreviated to:

SenSzCore—Sentence sense determination by computing of complementary, associative, semantical relationships.

Without meaning-checking, resp. without SenSzCore, it is not possible e.g. for speech recognition or translations to carry out really accurate, automatic, correct meaning-oriented work with texts themselves. Without meaning-checking blatant interpretation errors constantly occur in the automatic processing of meaning—as is the case with the application of the prior art.

Meaning-checking with SenSzCore is crucial to the automatic processing of texts with detection of the meaning of the words and represents the operational precondition for electronic sense processing (ESP[4]) of texts in high-level natural languages, in contrast to the prior art—Electronic Data Processing (EDP).

Statement on Translation Software or Speech Recognition Software from the Prior Art:

All applications which base the meaning of sentences on the analysis of words themselves—and not on their associations in the context and irrespective of how large the quantity of analyzed words is—can only find the correct meaning of the analyzed words in the context in approximately 50% of cases.

Proof:

Ca. 50% hit rate of e.g. standard commercial machine translation systems.

Cause:

The analysis of explicit—therefore purely lexical—data of the sentence existing in the form of 255 ASCII characters—e.g. by statistical methods with other similar sentences—cannot—per se—deliver any implicit information—because this is not inherently present in the alphanumeric character combinations, but in the mind of the reader of the text at the moment when he reads this text, assuming that he has sufficiently good language skills in the language in which the text is written.

In other words: the implicit information of the sentence is only monolingual[7], and can only be recognized computationally using associations that are processable by computational means—similar to those in the brain of a reader of the text—between the words of the language in which the text is written.

Figuratively speaking the invention represents a novel method, which with the application of "associably digitized meaning" (meaning-signals) of words in their context allows computational processing, similarly to the way in which a CCD camera, by turning exposed light-sensitive areas into pixels, is a prerequisite for the computational based processing of images.

Nevertheless, meaning-signals are logically and structurally much more complex than the short numerical information of image pixels which result from a light-sensitive surface.

Further examples relating to this issue are given in the next section.

1.5 Function Principle and Comparison to the Prior Art

If in the context of a German sentence (e.g. "Wir werden die Preise anziehen."—[We will increase the prices]), a person encounters words (here: Preise [prices]), for which for all semantic associations of its homonyms (here: anziehen [increase]) validate only one meaning in each case, then the sentence is univocal to a reader.

The subject matter of the invention is to implement this kind of decision—which in human beings occurs very rapidly and unconsciously—automatically and only by computational processing of the sentence itself, its context and its associated, invention-specific meaning-signals.

Especially in the case of translations or speech recognition, shortcomings in the automatic definition of the meanings of words quickly become clear:

Automatic machine translation systems according to the prior art will e.g. translate the German sentence:

"Ich nahm einen langen Zug aus der Zigarette." (I took a long draw from the cigarette.)

completely wrongly, as:

"I took a long train from the cigarette".

Or the sentence (FIG. 2.1.A1):

"Der Zug im Lauf verleiht dem Geschoss eine Drehung um seine Längsachse." (The groove in the barrel makes the projectile rotate about its longitudinal axis.)

completely wrongly, as:

"The train in the course gives the floor a rotation about its longitudinal axis." (FIG. 2 coordinate H8). See also the individual meanings of the words in Table 1.

Unless the sentence and its correct translation are available in the programs as a stored example, translation programs according to the prior art exhibit this type of serious error in approximately 50% of their translations.

To date, in the prior art only indirect methods of meaning assignment have been known in machine translation systems (e.g., U.S. Pat. Nos. 8,548,795, 8,260,605 B2, 8,190,423 B2). These try to determine the correct assignment of words in the context automatically, based on statistical or graph-based methods by analysis of large text corpora (collections of large quantities of text, e.g. translated EU minutes, with millions of sentences), or so-called "world knowledge databases".

In the prior art it is not even attempted to directly detect the actual, associable meaning of the input text—per se.

In the prior art, to assign a correct translation (=indirect meaning acquisition), all that takes place is an attempt to find sentences or sentence fragments that match frequently with the input text of the one language in the other language—in parallel—and to assemble them together to form a reasonably readable translation. The result is demonstrably unpredictable regarding quality: only about 50% of the translated sentences by machine translation systems according to the prior art are semantically and grammatically correct. (See also the examples in Table 5).

According to the new method (B), FIG. 1, of "meaning-checking", all relevant meanings of words of a language, including all their relevant inflected forms (variation of words according to grammatical rules, e.g. declension, plural formation etc.: the train, trains . . . go, went, gone, going, on the go . . . ) are numerically acquired and permanently stored in a computer-implemented database (e.g. FIG. 4.7) individually, so to speak, as digital meaning-signals.

The creation of the meaning-signals is a one-off manual operation that is carried out in advance. The resulting database, with about 50 million words in High German, corresponds roughly to the size of 20 large monolingual dictionaries, and is therefore approx. 1000× smaller than databases which are used e.g. in translation programs in the prior art.

By comparing the words in a sentence with one another, using all of their meaning-signals stored in the abovementioned database, it can be automatically calculated for all words what their correct meanings in the sentence context are in each case. For any given sentences and in any given context.

This represents a new, direct, deterministic procedure.

It allows for the use of pure arithmetics and requires no statistical or graph-based algorithms to compare the sentence, or parts of it, with large corpora in order to form statistical conclusions.

In the invention the sentence is not compared with other sentences—as in the prior art—but the meanings of its words with those of the other words of the sentence itself, and possibly with those of its immediate context. This is done numerically, at the level of words or word chains.

In the narrower sense what is performed with the invention is a local measurement—as with a digital measuring device by addition of digital signals from a signal source—in this case from a database—(for sample content, see Table 1) by retrieval of meaning-signals (FIG. 3.1) that are permanently assigned to specific words and all their correct inflected forms.

In the case of words with only one meaning, only a single, complete meaning-signal of the word and all its inflections is listed in the database. In the case of words with "n" meanings (homonyms), "n" and only "n" different meaning-signals of the individual word and all its inflections are listed in the database.

All meaning-signals of a word are—via its written form as text—retrievable from the database, regardless of the inflection in which it occurs. A meaning-signal exists in a standardized, alphanumeric, arithmetically evaluable, multi-dimensional form. (For components of the meaning-signals, see FIG. 3.1; for explanations see Section 3.2)

To determine the contextually correct meaning-signal of a homonym with "n" meanings within the context of a sentence, the "n" meaning-signals in all its categories are arithmetically added, in pairs, to those of all other meaning-signals of the words of the sentence (see FIG. 3.2 and FIG. 5). This happens as many times as there are different meaning combinations of all homonyms and words present in the sentence. Each meaning-signal of the homonym, modified by the arithmetic operation, is temporarily stored—for subsequent comparison. This is in matrix form, for example, as shown in FIG. 3.2.

If, following the arithmetic procedure of the invention a homonym can be found in the local context among the calculated results from the sentence, which is unchanged by any of the other words in the sentence in a relevant way in all its meaning-signals, then the sentence is not univocal and—in a manner similar to a spell checker—a message is displayed automatically to the user that no permissibly formulated text is present in the input sentence (FIG. 1, FIG. 4, FIG. 6). The invention therefore carries out, so to speak, an automatic "meaning-checking" of the sentence. (For comparison to a spelling check, see FIG. 1)

Meaning-signals can be permanently assigned not only to individual words, but also to predefined word chains (including so-called "idioms", e.g. German "schwer auf Draht sein" (literally "to be heavy on the wire")="to be fit"). When the term "word" or "words" is used hereafter, all statements made also apply to word chains, which are shorter than the sentence itself in which they occur. If a word is contained in a word chain for which a separate meaning-signal exists, then for the arithmetic calculations the word chain is treated as a single word.

Non univocal sentences can be neither correctly translated nor correctly indexed; they are therefore useless for "electronic sense processing"=ESP.

For "intelligent" processing of language it is therefore crucial to have a procedure that can measure the univocality of sentences.

2. Theoretical Background and Invention-specific Terms

The invention is based on, among other things, the linguistic, language-independent fact that:

in sentences with homonyms—or their immediate context—at least one other word of the same high-level language must exist for each homonym, which renders one and only one meaning-signal of each homonym valid, so that the sentence receives a unique meaning in this particular high-level language.

These words—which "validate" one of the meaning-signals of a homonym in the context—are hereafter termed "meaning-complementaries", or "complementaries".

In linguistics the term "complement" is familiar from structural syntax and has a completely different function than the "meaning complement" newly defined here. Also, the German neuter form "das Komplementär" [Complement] is selected, to distinguish it from the term "der Komplementär" [general partner] from commercial law.

Meaning-complementaries numerically change the meaning-signal of a homonym in individual categories greater than zero. The greater the arithmetic change in the meaning-signal of a homonym by other words, the stronger is their complementarity in relation to each other.

In Telecommunications Terms:

If the "n" meaning-signals of a homonym in a sentence undergo no amplitude modulation in the amplitudes of its meaning-signal that are >0 due to its context, in all its meaning variants, then the sentence does not have a unique meaning/is not univocal.

Hereafter, the superposition of meaning-signals is referred to as "modulation", as this best describes the process.

Each word can be a complementary for any number of other words. Therefore every word of a language must have its own meaning-signal, in order to be detected by the meaning-checking process with SenSzCore.

The meaning-signal structure in the invention is structured as a result of empirical trials, such that complementarity occurs in the same cases as those which a person of average education intuitively identifies when reading a sentence.

The meaning-signal structure in the definition and position of individual meaning categories is equal for all words (FIG. 3.1). Meaning-signals differ only in the values of their individual categories.

Meaning-signals can be thought of as multi-dimensional numerical fields.

Words with little meaning, such as: "thingamajig" (can mean almost anything) have values=0 in almost all individual meaning categories.

Abstract words, such as "heroism", or words with many semantic facets, such as "apprentice", have values greater than 0 in many positions. In compounds the meaning-signal of the word in many of its meanings can be framed to the greatest extent from the sum of the meaning-signals of its components.

E.g. the meaning-signal of the German word "Pferdewagen" ("horse-drawn carriage") is the sum of the meaning-signal of "Pferd 1" ("horse 1")<zool> and "Wagen 3"<2D Gefährt mit Roll_Rädern><kein eigen_Antrieb>("carriage 3"<2D vehicle with wheels><no intrinsic_drive>).

This example is intended to clarify the essential difference between a meaning-signal and the definition of the word.

- a meaning-signal is a numeric store of normalized associations.
- a semantic definition, by contrast, is a chain of words which can invoke associations in the brain when reading. See comparisons in FIG. 3.1 . . . .

Currently the meaning-signals in the invention consist of 512 individual meaning categories and 15 basic signal groups (FIG. 3.1). These indicated figures are only an empirically determined, pragmatic value that produces good results in the new procedure when calculations from the invention are compared with the perceptions of human beings in relation to the uniqueness of sentences. But other values can also be used. Less than 50 individual categories and less than 3 basic signal groups generally lead to unusable results, however, that are roughly as poor as those of e.g. machine translation systems from the prior art.

For German, the invention has a database of approximately 50 million words (approx. 0.1% compared to the volume of words in statistical translation programs according to the prior art), which are composed of the inflected forms of approximately 1 million different words in their base form, which in turn consist of meaning-signals which can be formed from approximately 20,000 relevant basic meaning-signals of a high-level language.

This fine resolution corresponds to everyday business language usage—technical, commercial, scientific.

More restricted specialist language domains, such as gastronomy, could be described sufficiently well with as little as 1/10 of this volume of words. For good results in restricted ontologies[7] however, the full set of all homonyms from general language and the restricted language domain must be included in the selection.

2.1 Structural Information on the SenSzCore Database

Words A, A', . . . with equal meaning-signal but spelled differently from another word B are synonyms of B.

Words A, A', . . . with different meaning-signal and spelt the same as another word B are homonyms of B.

Words A, A', . . . with largely similar, but shorter meaning-signal than another word B may be hyponyms of B.

Words A, A', . . . with largely similar, but longer meaning-signal than another word B may be hyponyms of B.

For each high-level language there are approximately 50,000 relevant synonym groups with on average approximately 8 synonyms.

The words of a high-level language which have no relevant synonyms are hereafter referred to as "singletons".

100% synonyms are usually only variant spellings of a word (e.g. photo/foto). In the databases of the invention, words that have meaning-signals with an overlap of >85% relative to each other are treated as synonyms. The decision is however made manually—in advance—when the data are created, and following the rule: synonyms are words that in a sentence are interchangeable without changing the sentence meaning significantly.

Another important property of meaning-signals is that they are language invariant. From this it follows that: all of the words of equivalent synonym groups have the same meaning-signals in all languages.

The calculations of the "meaning-checking" on the basis of meaning-signals can therefore be performed irrespective of the source language.

Meaning-signals are additive in certain areas. Within a meaning-signal, multi-dimensional valence references between individual meaning categories are also possible and present (see constraint references (CR) in FIG. 3.1, Section 3.2).

2.2 Notes on Function and Terms Based on Examples

Example A1: German "Wir werden sie anziehen" (We will tighten/dress/attract . . . them):

In this case the sentence has a transitive meaning of the verb "anziehen", for which the SenSzCore database contains 10 different, transitive meaning-signals.

Including (highly simplified representation)

| Homonym | Short Description | Example |
|---|---|---|
| anziehen1 = | put on clothing, . . . | (e.g. trousers) |
| anziehen2 = | increase interacting force, . . . | (e.g. screw) |
| anziehen3 = | increase value, . . . | (e.g. prices) |
| anziehen4 = | exert attractive field force, . . . | (e.g. with magnet) |
| anziehen5 = | appear mentally attractive to s.o., | (e.g. by words) |

-continued

| Homonym | Short Description | Example |
|---|---|---|
| anziehen6 = | make data available, . . . | (e.g. quotation) |
| anziehen7 = | retract, do not stretch . . . | (e.g. leg) |
| anziehen8 = | exert indirect attraction force, . . . | (e.g. tree stump with rope) |
| . . . | | |

In the example A1: "Wir werden sie anziehen" the addition of e.g. "Hose" (trousers) would create univocality:

"Wir werden die Hose anziehen". (We will put on the trousers).

The meaning-signal of "trousers" carries values in multiple categories of meaning-signal that also match categories occupied by the meaning-signal of "anziehen1": "put on clothing".

The meaning-signal of "anziehen" in the meaning "put on clothing" is thus changed significantly by the presence of "Hose" (trousers) in the sentence. "Hose" (trousers) and "anziehen" ("put on") are therefore complementaries in the sentence "Wir werden die Hose anziehen." (We will put on the trousers.)

The meaning-signals of "trousers" and "put on" are each modulated significantly in 1 of their meaning possibilities. In all their other meanings they either do not modulate each other or do so to a considerably weaker degree.

Similarly, univocality of the sentence would be created with the other meaning-signals of "anziehen", if one were to write:

"Wir werden die Preise anziehen." (Preise='prices') (=increase), or

"Wir werden die Beine anziehen" (Beine='legs') (=bend), or

"Wir werden die Schraube anziehen" (Schraube='screw') (=tighten) etc.

Each of the words added to example A1 modulates another meaning of "anziehen" as a complementary and automatically validates a single specific, different, correct measurement and therefore makes it automatically processable. The homonym is "validated" by the complementary.

For each sentence which contains "anziehen"—transitively—SenSzCore will respond to complementaries in a similar form. E.g. "Rock (skirt) 2<clothing>", "Gehälter (salaries) <econ>", "Arm <anat>", "Dehnschraube (Expansion bolt) <mech>", "Bremse (Brake) 3<mech>" etc., lead in just the same way to a correct, automatic calculation of the local, transitive meaning of "anziehen", such as the complementaries already mentioned above in example A1.

If one were to write the above complementaries into a preceding sentence:

Example A2:

"Wir haben die Marktpreise sorgfältig geprüft. Wir werden sie anziehen" (We have carefully examined the market prices. We will increase them.), then the invention recognizes the relation between "sie" (them) from sentence 2 and "market prices" from sentence 1 and automatically calculates the meaning "erhöhen" (increase) of "anziehen" as the relevant one.

Hereafter we call this condition: "cross-sentential complementarity". This occurs very frequently with "deictic[7]" references in the sentence.

The function of the invention also allows the automatic selection of the correct meaning of a homonym if several complementaries occur in the sentence:

Example A3:

"Er nimmt den Schraubenschlüssel aus der Hose and wird die Schraube anziehen." (He takes out the wrench from the trousers and will tighten the screw.)

Here, "screw" and not "trousers" is the complementary of "tighten". Due to the conjunction "and" the invention recognizes the subject "screw" in the second main clause, which constrains the search for complementaries to this second main clause.

If several homonyms are not sharply separated from each other syntactically (e.g. as would be the case with conjunctions), then essentially the same standard procedure is followed as when the sentence has only a single homonym. All meaning-signals of the words of the sentence are compared with all meaning-signals from all other words of syntactically definable sentence parts. Usually, the complementaries in this type of sentences only occur in close proximity to their homonyms—because otherwise, these sentences would be very difficult to understand. This is why in the invention, in the case of sequences of multiple homonyms, the distance between them in the sentence is included in the calculation. Usually, the subject-object relation can also be helpful in this approach.

If a homonym modulates with several other homonyms, then the meaning-signal of the other homonyms which they themselves most resemble is preferred. Hereafter we call this condition "multiple complementarity". If at the end of the calculations there is more than one possibility with the same value, the meaning of the sentence is not unique and the "meaning-checking" automatically generates an error message.

For completeness, here is another example.

Example A4:

"Er ist am anziehen" (He is tightening/bending/increasing etc.), in which the intransitive[7] meanings of "anziehen" must be used.

These are:

| Homonym | Short Description | Example |
|---|---|---|
| anziehen11 = | exert a drive-dependent force, . . . | (e.g. locomotives) |
| anziehen12 = | actively modify material structure, . . . | (e.g. adhesive) |

In this case the sentence A4 is inherently logically not univocal. In the invention, only suitable complementaries of the meaning-signal of drive-dependent objects such as "locomotive" for anziehen11 "The locomotive is being driven", or chemically active materials such as "adhesive" for anziehen12 "The adhesive is setting", lead to a correct meaning assignment. The use of e.g. "Hose" (trousers) in "Die Hose ist am anziehen", on the other hand—in the absence of complementarity—leads to an error message from the "meaning-checking".

This is because the word 'trousers' has in the meaning-signal no values in categories such as "can exert drive-dependent force" or "can actively modify material structure" which modulate 'anziehen' in the intransitive syntactic function.

2.3 Notes on the Function and Terms on the Basis of Examples with Translations from the Prior Art A particularly impressive way to demonstrate the difficulty of automatic electronic sense processing "ESP" and the accurate, simple functioning of the invention is by using typical errors from well-known machine translation engines from the prior art.

First Some Observations on the Prior Art: (Table 2)

In B1 and B2 the most common use of "Zug" is obviously used in the translation: "train". This is the typical result of a statistical approach to determining the "meaning". In example B1, each of the 3 homonyms "train", "running" and "floor" is even incorrectly detected in the meaning and therefore incorrectly translated.

In B1 the meaning "running" is used for "Lauf", instead of the meaning "gun barrel".

In B1 the meaning "floor" is used for "Geschoss", i.e. the floor of a house and not the word "projectile".

In B3 and B4 the meaning "bullet" is used for "Geschoss" instead of the floor of a house, "floor".

By using "meaning-checking" in these 4 examples, only correct interpretations are obtained, because in each example sufficient complementaries are contained which determine the univocality of each sentence arithmetically:

In B1: the word "Geschoss" gives the meanings of "Zug" and "Lauf" a high priority in their "weapons-related" meanings, (Engl.: "groove" for "Zug" and "barrel" for "Feuerwaffen-Lauf") and therefore produces—by using multiple complementarity—the correct translation into English by the invention: "In the groove of the barrel the projectile gets a rotation around his longitudinal axis." See also FIG. 2 and Table 1.

In B2 "zigarette" (cigarette) gives priority to the "Zug" from "Lungenzug" (Engl.="puff"), so that the correct translation into English is given by SenSzCore: "In the course of the last minute I took just one deep puff from the cigarette."

In B3 "Gefahrenausgang" (emergency exit) and "Gebäude" (building) are the complementaries for "Geschoss" of a building ("floor") and thus produce the correct translation into English by the invention: "The floor must have an emergency exit on the rear of the building."

In B4 "Personen" (people) and "sperren" (lock) are the complementaries for "Geschoss" (floor) of a building. In the second clause the word "Sturm" (storm), due to its mobility and dimensional values, among others, gives the complementarity of the synonym group "heranziehen" (engl. "be approaching") to the word group "im Anzug sein" ("be approaching") in the meaning-signal and therefore produces the correct translation into English from SenSzCore: "The floor was barred for persons, because a storm was approaching." It is important to note that a complementarity for "Anzug" (suit), in the sense of clothing, is not present in this sentence.

Important Note:

The quality of a translation is determined by, amongst other things, the fact that homonyms in the target language also find the correct complementaries of the other language in the sentence. This is also automatically ensured by the design and structure of the invention: By selecting the translations from synonym groups that are assigned to an identical meaning-signal in all languages, the meaning complementarity of the words is necessarily preserved after the translation.

To provide an overview of typical difficulties in the assignment of meaning in the prior art as compared to the invention, the most recent examples are summarized again in Table 3.

3. Detailed Description of The Invention

BRIEF DESCRIPTION OF THE DRAWINGS

The figures explain the basic components of the invention in detail.

FIG. 1 shows a simplified flow diagram which compares—in purely formal terms —the process of spell-checking (A) with the new meaning checking (B);

FIG. 2 shows an overview of automatic "Meaning-Checking" in a highly simplified form, with examples of its application in a: [A] machine translation system [B] speech recognition engine;

FIG. 3.1 shows an overview of the structure and content of meaning-signals;

FIG. 3.2 shows a typical value comparison matrix for the comparison of meaning-signals;

FIG. 4 shows a system overview of the meaning-checking system;

FIG. 5 shows a flow diagram for calculating the meaning scores of words (procedural box 4.11 in FIG. 4); and FIG. 6 shows a summarized flow diagram of the meaning checker with numeric references (x) referring to Section 4.

DESCRIPTION OF THE INVENTION 3.1 Explanation of the Processes in FIGS. 4+6:

By means of data input, e.g. using a display device or a speech recognition system and corresponding signal conversion, the processable text reaches the computer-implemented meaning-checking system (sections 4.5 to 4.13 in FIG. 4).

The invention can also be described in an abstract form as a:

"computer-implemented, context-sensitive signal transducer+measuring device".

This means that in the invention, pure orthographic signals are converted into meaning-signals, by means of a measuring device, that a) determines whether the text input is univocal and b) if yes, each string of letters without spaces is associated with a correct meaning-signal—in relation to the context of the sentence.

The meaning-checking processes the text sentence by sentence.

The processing of single words is not provided, unless there are sentences of length=1_word which have a special semantic/syntactic function (e.g. interjections such as "Hello!", "please!"; or impersonal verbs, e.g. in Romance languages: Spanish: "Llueve.", Italian: "Piove." . . . ="It's raining.").

After the existence of all the words of the sentence has been checked in 4.5.1 against the data held in the EDP system 4.7 and is positive (i.e. all cases where the letter combination itself does not lead to exclusion, e.g. "haven" instead of "haben" or "haken", etc.), a recursive, automatic operation is performed in which the syntactic function for each word in the sentence is determined. This process does not require the use of classical "parse trees". Using the meaning-signals of particles and the subsequent words, in over 85% {own empirical evaluations of thousands of sentences} of practical cases it is possible to determine the syntactic function of each word, if no structural spelling errors are present (structural spelling error=incorrect letters).

If it is not possible to determine the syntactic function of each word (approximately 15% of cases=all words exist but their syntactic function cannot be uniquely identified), it is supported by the calculation of meaning-signals in individual word pairs whose syntactic function cannot be determined exclusively via their position in relation to each other.

This also already takes account of any syntactic spelling errors of words which, e.g. in German, allow both upper case and lower case spelling of a word, but which is not correct for the current sentence (e.g. "Wir Karren den Mist vom Hof." (We cart [noun] the manure from the farm."). Several recursive loops are possible between 4.5.1 and 4.5.2.

E.g. "Die liegen am Pool waren Besetzt." (The lie at the pool were occupied." . . . will require 2 passes. (The completely wrong, structurally correct spelling is of course already ruled out by 4.5.1).

It is important to note that, for sentences such as "Wir Karren den Mist vom Hof." (lit: We cart [noun] the manure from the farm.), in contrast to SenSzCore, popular spell checkers from the prior art—as a result of their functional principle—cannot display an error . . . and in fact do not do so.

If there is no univocality in the syntax itself—i.e. where a word can be e.g. only a noun but is used with an adverb, e.g. "I want fast car.", then automatic user dialogs 4.9 are invoked or at a higher level via the User Interaction Manager, FIG. 6 (7), which display the fundamental, syntactic ill-formedness of the sentence. The exclusion criteria are automatically displayed, but in this case no indication of correction options is given.

If the syntax of the sentence is univocal, then a meaning check 4.11 takes place according to the automatic process shown in FIG. 5.

This is supported by the EDP system 4.7 and appropriate databases, temporary storage facilities, and arithmetic calculation functions. (See also the explanations for FIGS. 3.1 and 3.2).

It is important to bear in mind that SenSzCore does not initially evaluate non-univocalities that are of a purely logical nature:

For example, the sentence "Meine alte Freundin hatte gestern Husten." ("My old girlfriend had a cough yesterday."): in terms of meaning-signals the sentence is univocal. Whether the "girlfriend" is old or is "a long-term friend," remains a secret known only to the author of the sentence. This logical non-univocality is maintained in translations with SenSzCore, without leading to a semantic error in the target language. It is in fact, inter alia, a quality hallmark of any translation that logical content of the sentence is not changed unnecessarily in the target language.

With SenSzCore, after the completion of the calculations 4.11—if the sentence is univocal—the most common synonyms are also now available for all words. These are displayed to the user on request in the autotranslation 4.8. If the user e.g. has entered the sentence: "Ich nahm einen tiefen Zug aus der Zigarette" ("I took a deep draw from the cigarette"), he obtains from the autotranslation, 4.8 a sentence in which the inflecting homonyms are substituted with their most relevant synonyms from the database 4.7. In this case, the user obtains: "Ich nahm einen tiefen 'Lungenzug', aus der 'Filterzigarette'." (I took a deep draw from the filter cigarette.) This function is intended to show the user on request—in his own language—that the meaning he wanted to express has been correctly recognized by SenSzCore, by substituting semantically correct synonyms.

It is important to note once again the fundamental difference between the statements 4.4 (—before—meaning-checking) and 4.12 (—after—meaning-checking) in positions 1) and 2).

The invention has now transformed a text without any semantic information, e.g. 2.1.A1 into a text with semantic information 2.1.A2 which has been calculated solely from the comparison of the meaning-signals between the words of the sentence and which was not previously—explicitly—contained in the input sentence. See also further information in FIG. 2.

After the completion of the calculations an alternative representation can be computationally created for the sentence with coded values which correspond to the meaning-signals of the words (FIG. 4.13), including their syntactic and morphological information, which of course has also been determined by SenSzCore. This additional information can therefore be indexed in multiple ways. It is crucial that the mathematical univocity between meaning-signals and coded values of the indexing remains known in computational terms. The indexing is advantageously effected using the meaning-signal itself, but can also be supplemented or replaced by other user-specific codes, which retrieve the meaning-signal from linked data only on subsequent use.

A sentence coded in such a way can now be advantageously further processed in the listed functions 4.14 to 4.19. A serial processing is performed in the case of translations (4.14) and user dialogs (4.16), and in search engines (4.17).

In the case of other functions, a recursive process with (4.7), (4.9), (4.11) will often be necessary beforehand. Recursive loops are performed in advance, particularly in the case of speech recognition (4.15), spell-checking (4.18) or word recognition (4.19). Here, the processes 4.5.1 and 4.5.2 also play a more important role in the interaction with the user than is the case for the other functions.

A very important operational advantage of the invention is that, in the case of interactive operation, it is always clear to the user how good his text is in terms of semantic univocality, and that he can intervene directly. People who write well, in the sense of comprehensibility, grammar and syntax, barely receive any queries from the system.

If the system is used off-line, e.g. when translating large quantities of text, the system can be configured such that all queries can be post-processed in batch mode.

Explanatory Notes to FIG. 6

For the assignment of the claims in section 4, the illustration in FIG. 6 was chosen. In FIG. 6 the recursivity of the processes of steps 4.5 to 4.11 is shown more formally and associated with individual results, in order to be able to formulate the claims more easily. To allow understanding of the processes in the system themselves, simpler explanations for a person skilled in the art are possible with FIG. 4.

Modulator (2) of FIG. 6 represents in practice the multiple passes 4.5 to 4.11 which take place until there are no more words with basic spelling errors. Modulator (3) of FIG. 6 shows the multiple recursive passes which take place until the analysis of the sentence itself in the morphological, syntactic sense, and its univocality measurement, are complete.

In this sense FIG. 4 contains a highly operational representation of the invention to better explain the individual functions. FIG. 6 contains a formally simplified view of the invention to better illustrate different claimed areas of application of the invention. FIGS. 4 and 6 therefore differ only in the degree of abstraction of the representation, but have no functional differences.

3.2 Explanations to FIG. 3.1

The table of FIG. 3.1 is to be regarded, in a figurative sense, as the 2-dimensional schematic diagram of a more than 3-dimensional number space. It explains the structural, configurational and assignment principle of meaning-signals, but is not a visually comprehensible structure itself.

Expressed in highly simplified terms, a meaning-signal is the content of a column in FIG. 3.1, from column "D" onwards.

Meaning-signals constitute a computational tool which enables the software algorithms of the invention—that are controlled automatically by the current text and context—to extract implicit information from texts.

FIG. 3.1 shows an extract of the meaning-signals for 9 words, which is readable in 2 dimensions. (For words see coordinates D1 to M1). FIG. 3.1 is also an aid to make FIG. 3.2 easier to comprehend. The sentence: "Der Stift schreibt nicht" (The pin/pen/institution etc. does not write/author) is analyzed. These words are listed in FIG. 3.1.

The headings in lines C1-M5 contain general remarks on the words. From line 6 invention-specific content is displayed. It should be noted that the information in line 3 represents standard dictionary information that has no invention-specific relevance, because no modulation between homonyms and complementaries can be calculated with them.

Lines 9 to 42 show for each word an extract (approximately 10% of the total content) of its meaning-signal. Columns B and C (meaning-signal category 2 and meaning-signal category 4) represent a verbal assignment—i.e. a feature description—of the respective individual meaning-signal value. They are only shown for explanation purposes. Line 7 contains for each word the number of occupied fields in the meaning-signal and to the right of the slash, the number of constraint references (CR) e.g. for "schreiben 1" (to write) 86\3.

Constraint references are situational attributes, according to which the values of categories in meaning-signals can be automatically switched on or off depending on the context. For example, during its construction, a building ("Stift 4.1" column I, lines 10, 37, 39, 41) is assigned properties (=features+values) with the abbreviation H (for German 'Herstellung' (=construction)) which the building no longer has during its subsequent usage, only during its construction period.

The suffix F, e.g. in cell F27 for "Stift 1", indicates a functional requirement. Homonyms of a word without a regular, fixed surface will modulate with "Stift 1" less well than those which have a fixed, regular surface.

Other attributes are activated, e.g. by the constraint references (CR), when meaning-signals occur in the environment of the word which are assigned to the trigger words in line 6 of the meaning-signal.

It is important to note that, in this manner, a pattern of the constraint references (CR) in the sentence is also produced, which also generates—like the modulation of homonyms with complementaries—non-explicit, contextual information.

For example, the sentence: "Der Stift (3) hört dem Lehrer nicht zu." (The institution (3) does not listen to the teachers.) contains a (CR) pattern including "School 9 (institution or building)", which in turn can become a complementary for other homonyms in the context of the sentence as a meaning-signal. The meaning-signals of (CR) patterns are automatically retrieved by SenSzCore during the calculations and combined, automatically saved or continuously updated over several sentences, or to the end of a paragraph of a text.

These effects are the basis for the fact that logical conclusions can also be drawn from the context with meaning-signals using (CR). (CR) are therefore also one of the bases on which SenSzCore in the case of unique sentences, can also automatically "read between the lines".

Especially in combination with e.g. adverbs of all types, temporal\spatial\justifying\or modal prepositions or logical operators (not, and, or, etc.), in many sentences logical inferences can also be identified and stored in an appropriate manner for further processing. (Embodiments No. 44-47)

Since for (CR) the meaning-signals are known, all synonyms, hypernyms and hyponyms of (CR) can also become active, including all of their inflections, in the same way as the explicitly specified (CR) itself. For example, if "Gebäude" (building) is entered in a word as a (CR), then e.g. "building site", "high-rise", "house", "government building", etc. and all their declensions and plurals are also activated automatically in the "meaning-checking", with differences between more general expressions or more concrete ones, such as government building, also being included in the meaning-signal. In "government building", positions in the meaning-signal which contain social-political components are occupied, which in turn are associated with the constraint reference exercise of profession.

It should be noted that in the operative embodiment, the (CR) marking takes place with non-numeric characters in a different indexing level. Thus, in the arithmetic part, meaning-signals always contain arithmetically processable values. All other components are contained in other index dimensions and can be automatically retrieved or combined.

The features in columns A, B and C of the individual meaning-signal values do not represent partial definitions of the words in themselves, but e.g. associations of the common sense such as would be given if someone were asked to sketch a pictorial story for the word in question. This pictorial story must illustrate which features are associated—even in abstract form. In this sketch must be shown which acting subject types/object types, which triggers, which dimensions have relevant associations when the word is used, etc. For understanding the structure of meaning-signals, in the broadest sense, the basic principles of the design of design catalogs {Konstruieren mit Konstruktionskatalogen ISBN 3-540-67026-2} may be useful.

Because categorizations are always arbitrary and relative, the categorization cannot make any absolute claims for meaning-signals either. The best that can be achieved is to assess the degree of usefulness of each categorization in relation to its intended application. The primary benefit of this form of categorization of the meaning-signals of words is that it is structured in such a way that:

1. As few features as necessary must be used.
2. As many features are included as necessary such that for all words in a language, sufficiently many relevant associations are indicated, so that homonyms are only modulated by the correct complementaries.
3. Association levels are included which, depending on the application environment of the word, can affect the meaning-signal (=constraint references (CR) in line 6). It should be noted that all trigger words of the (CR) occur in the homonym notation (=Word+current homonym number in our databases). Each one therefore has its own fixed basic meaning-signal, regardless of the inflection in which they occur.
4. The modulation of homonyms of a sentence by complementaries with maximum frequency in the sentence/context thus ultimately corresponds to the way in which a human being with a good knowledge of the high-level language would assess the sentence for univocality.

The derivation of the meaning-signal categories themselves is based to a large extent on a tree structure, building on the basic elements of matter, information, energy and time supplemented by emotional, vegetative, trigger, process, and spatial/place features. Category 1 is upstream of Category 2. In this diagram—for reasons of space—Category 3 is included in Category 2. Category 4 represents the comment that the authors of meaning-signals read—when creating the database of the invention—in order to assign a value to the meaning-signal or not. The volume of work involved in creating meaning-signals roughly corresponds to the effort involved in writing a large dictionary, but with a very specific, numeric notation. The assignment of the individual values in the meaning-signal is in the majority of cases fuzzy (closer to yes, closer to no) and in the case of yes, with values that are greater than 1 if "a lot" of the individual association is present. Other assignment forms are used e.g. in the case of material properties, such as density to water (FIG. 3.1 line 17). Here the value 1=lighter, 2=equal, 3=heavier. The same applies to air.

Such values lead to the result that, e.g. in the sentence: "Das Fahrzeug schwebt in der Luft." (The vehicle floats in the air), the meaning-signal of a Zeppelin with the (CR) "usage" has a higher modulation with "float", than for example, a "car" or an "aeroplane". In the case of a car or plane, a compatibility query to a logic inference program can even be initiated.

3.3 Explanations to FIG. 3.2:

Seen here is the extract of the calculations for the sentence: "Der Stift schreibt nicht." (The pin/pen/institution . . . does not write/does not author.) This sentence does not have a unique meaning.

The verb "schreiben" (to write, etc.) has 4 meanings and "Stift" has 12. Fields 1.1 to 4.20 are irrelevant, because they are symmetrical to the occupied fields, without additional information.

Black, diagonal fields are irrelevant, since they represent comparison of each word with itself.

Fields 1.1 to 4.4 and 6.6 to 20.20 are also irrelevant here, since they only compare meanings of a homonym with each other.

In the matrix 35 cells are marked with "XX". Other fields contain figures between 30% and 100%.

"XX" means that computational, logical and or morphological/syntactic comparisons between the meaning-signals of the meanings involved have led to the exclusion of the combination.

Percentage values represent the degree of meaning-modulation of the meaning-signals of the words that intersect in that field.

The cells marked with XX in this case refer specifically to the fact that a. in "schreiben 1", the verb does not allow any motor activity by the subject of the sentence, if this is an item: in that case only a function such as "schreiben 3" can be exercised here
b. "schreiben 3", i.e. the writing function of a tool/device—cannot be applied to a living being as the grammatical subject ("Stift")
c. in the case of "das Stift" (lines 9, 10, 13, 14, 15, 16) for example, it is additionally the case that the article (gender) does not match that of the example sentence.
d. In line 4 no "XXs" are entered as the variant is entirely absent, (in the example sentence there is no reflexive usage of 'schreiben' (to write))

If we now automatically write a list with the modulation results sorted by descending size, a meaning-signal intersection ranking (SSIR) is obtained.

To see an overview of the remaining possibilities, the 'autotranslation' function is used: it shows each one of the alternatives by displaying the relevant words in terms of their most common synonyms (underlined in the examples) of the homonym in context in the input language of the user.

According to the number and the value of the largest values, the following analysis, or autotranslation, is generated automatically from the SSIR. The value of 66% is an empirically determined value that can be specified individually according to the ontology and language and represents a lower, relative relevance limit for meaning-modulation:

1. The sentence 'Der Stift schreibt nicht.' does not have a unique meaning and admits [5] possible relevant interpretations >66%: (underlined words=synonyms for Stift or schreiben)
   i schreiben 3 (as function), with Stift 1 (pen). Autotranslation: The pen does not work.
   ii schreiben 2 (create readable work with text), with Stift 3 (apprentice) or Stift 5 (nipper, brat)
   Autotranslation: The apprentice does not author.
   Autotranslation: The nipper does not author.
   iii schreiben 1 (motor activity), with Stift 3 (apprentice) or Stift 5 (nipper, brat)
   Autotranslation: The apprentice is not writing down.
   Autotranslation: The nipper is not writing down.
   The remaining combinations result in lower values. For example, as a machine translation system e.g. in the area of everyday business usage (technical, commercial, scientific language), the variants ii and iii would be ruled out as "Stift 3" is defined within the meaning-signal only for <regional application>, whereas "Stift 5" is defined as <jocular>. Therefore the only remaining interpretation is that the pen is not working.
2. The user is automatically given the choice to accept Option 1 SenSzCore and an automatic indication of the remaining possibilities is given in ii and iii.
   Important note: the numerical modulation values are based on the properties of the meaning-signals that the system was previously manually "taught" and are permanently stored. The values of the meaning-signal therefore reflect the associations of "one" person, namely the person who created the relevant meaning-signals, and not an absolute decision in itself. As a consequence, the modulation value of 2 meaning-signals is of course also not an absolute, but a relative statement.
   Also, in making the decision for i there is no statistical evaluation used, because it was actually counted—not extrapolated—and alternatives e.g. below the limit of 66% were discarded.

Explanatory Notes to Table 5

Table 5 shows the comparison of the best commercially available programs (as of January 2014), on the basis of 5 example sentences:

I) Der Stift kauft ein Stift. "The Stift (masc) buys a Stift (neut)"
II) Der Stift kauft einen Stift. "The Stift (masc) buys a Stift (masc)"
III) Das Stift kauft einen Stift. "The Stift (neut) buys a Stift (masc)"
IV) Der Stift schreibt nicht. "The Stift (masc) does not author."
V) Das Stift wurde in einem Zug geräumt. "The Stift was vacated in one go."

The 13 different meanings for 'Stift' are listed in FIG. 3.2. Overall, for the 5 example sentences there are 21 possible, relevant meanings. In the prior art only 3 of 189 possibilities are correctly recognized/translated.

The comparison shows clearly that standard commercial programs—whether they are free of charge or not—either cannot calculate several basic facts for meaning detection/do so too seldom, so that in these examples an average hit rate of only 1.5% arises:

For example, programs according to the prior art—in addition to numerous other weaknesses—fail in the following cases:

(a) Detection of the gender of nouns, even when an article is present.

(b) Differentiation between inanimate object/living creature/institution.

(c) Permitted actions of the agent (e.g. things cannot "buy" anything).

(d) Detection of the relative proportions of subject and object: what fits where? For example, "das Stift" (institution) does not fit into a train (sentence no. V).

(e) Differentiation of homonyms and their correct translation.

(f) Warning the user when errors or non-univocality are present in the text.

Etc., etc.

For other comparative details on the weaknesses of state of the art programs based on examples, see the lower box in Table 5 "linguistic comparison" starting from coordinate C34).

For other typical, process-related errors from the prior art in translation software from the largest companies in the industry, see Table 6.

It is clear that with this prior art (which has been optimized for over 25 years), no serious work is possible.

No matter what the source language and the target language are—e.g. within European languages.

Hereafter, some of the different embodiments of the invention are described in a structured form.

1. The starting point is a computer—implemented method of "meaning-checking", which automatically converts the semantic meanings of the words in a natural language sentence which are not explicitly present into numbers—called meaning-signals—and which deterministically calculates correct meanings of all the words of the sentence for the sentence context with the meaning-signals, characterized in that:
   it is stored in a non-transitory, machine-readable storage medium and equipped with instructions executable by a computer, such that when these are executed by a computer processor, cause, for a sentence to be analyzed—beginning and ending according to the applicable rules of the natural language—of a text of the natural language, all available meaning-signals according to the invention to be automatically extracted for each word from the computer-implemented memory (1) and the arithmetic and logical comparison of the meaning-signals of all of the words of the sentence with each other—controlled only by the words themselves and by their specific arrangement in the analyzed sentence—is carried out in the meaning modulators (2) and (3) in such a way that each word, using its meaning-signals calculated as valid for this context, by means of associated, processing-relevant comparison data relative to other meaning-signals automatically created in the analysis separately for each word and assignable to the word, is tagged in a machine-readable form with other words of the sentence, and subsequently explicitly with the information, such that it can be automatically deduced from this tagging whether the word in the context is spelt correctly and whether the word has only one or multiple meaning-signals in the context and what these meaning-signals are.
2. Method according to No. 1, characterized in that, once the meaning score has been calculated for all the words in a sentence in the meaning modulator (2), the following information is available in machine-readable form:
   2.1. If the meaning score "SW" for a word of the sentence is equal to 0 (zero), then the word is spelt incorrectly and the sentence receives the sentence score "SS"=0.
   2.2. If the meaning score "SW" for a word of the sentence is greater than 1, then the analyzed sentence is incorrect, or not univocally formulated, because words with SW>1 have more than 1 possible meaning in the sentence. The sentence receives the sentence score "SS"="SW". If more than 1 word of the sentence have meaning scores>1, then the sentence score "SS" is set to the maximum value "SW" of the meaning scores of the words of the sentence.
   2.3. If all the words of the sentence have a meaning score "SW"=1 then the sentence is univocal and receives the sentence score "SS"=1
   2.4. If words have a meaning score "SW"=−2, then they allow both upper and lower case spelling. The sentence score SS then receives the value SS=−2, until the correct upper or lower case spelling of the words with SW=−2, in this sentence, is finally calculated using further iterative steps.
3. Method according to No. 1 or 2, characterized in that for sentences that no longer contain any words with SW=0, it is calculated in constraint modulator (3) what sentence score "SS" they have when the constraint references (CR) present in the meaning-signals are used, and the following resulting information is available in machine-readable form:
   3.1. If the meaning score "SW" for a word of the sentence is greater than 1, then the analyzed sentence is incorrectly or not univocally formulated, because words with SW>1 have more than 1 possible meaning in the sentence. The sentence receives the sentence score "SS"="SW".
   If more than 1 word of the sentence have meaning scores>1, then the sentence score "SS" is set to the maximum value "SW" of the meaning scores of the words of the sentence.
   3.2. If all the words of the sentence have a meaning score "SW"=1 then the sentence is univocal and receives the sentence score "SS"=1
4. Method according to at least one of No. 1 to 3, characterized in that in words with SW=0, a storable error message is launched, which in particular indicates spelling errors of all the words of the sentence, naming the relative word position in the sentence, the cause of the error and displaying possibilities for eliminating the error calculated from the memory of the database system (1), and is stored sequentially in the error-message-storage (4).
5. Method according to No. 4, characterized in that in words with SW=−2, a storable error message is launched, which in particular indicates the presence of case errors in the spelling of all the words of the sentence, naming the word position in the sentence, the cause of the error and displaying possibilities for eliminating the error calculated from the memory of the database system (1), and is stored sequentially in the error-message-storage (4).
6. Method according to at least one of No. 1 to 5, characterized in that together with the current sentence, depending on availability, up to "n" immediately preceding sentences which have already been processed according to No. 1 and have sentence score=SS=1, are read in and the meaning-signals of their words are processed in the meaning modulator (3).
7. Method according to at least one of No. 1 to 6, characterized in that the syntactic sentence components such as are present in the sentence (main clauses, dependent clauses, inserted dependent clauses, subjects, predicates, objects, text parts between hyphens, text parts between two brackets (open/closed), etc.) are determined and stored in the sentence part memory (6) individually, sequentially, and retrievably with all the words that form them.

8. Method according to at least one of No. 1 to 7, characterized in that in the meaning modulator (3) the main theme of the current 3 sentences, if each of their sentence scores=1—where they exist—are updated on a rolling basis.
9. Method according to at least one of No. 1 to 8, characterized in that in the constraint modulator (3) the main theme—as the most frequent, valid constraint reference (CR) from (3), for example also in the form of its meaning-signal—of the current paragraph, in the form of the meaning-signals of the constraint references, is updated on a rolling basis and is made hierarchically retrievable.
10. Method according to at least one of No. 1 to 9, characterized in that in the case of sentences with SS>1 an autotranslation message is generated, which lists the still existing #SW meaning possibilities of each word and in each case retrieves the most common synonyms of each word from the database system (1) using its valid meaning-signals and stores them sequentially in the autotranslation storage (5).
11. Method according to at least one of No. 1 to 10, characterized in that, for words in which SW is not equal to 1, formatting elements are specified in the error-message-storage and the User Interaction Manager (7), that can be used in text editing programs to store the status of the word from the autotranslation storage (5) or the error-message-storage (6) for each affected word, e.g. visually on the display device of the user and, for example, to generate "mouse-over" information on the display device of the user.
12. Method according to at least one of No. 1 to 11, characterized in that, from interactions of the user in relation to the User Interaction Manager (7) regarding correction suggestions originating from the autotranslation storage (5) or the error-message-storage (4), the text in the sentence is updated and a new calculation run according to No. 1 is carried out for the sentence, wherein all entries in the autotranslation storage (5) or the error-message-storage (4) are adjusted to match the latest processing state of the sentence.
13. Method according to at least one of No. 1 to 12, characterized in that, the current topic structure from modulator (3)—continuously updated—is displayed to the user via the User Interaction Manager (7) in a separate window, for example on the display device used.
14. Method according to at least one of No. 1 to 13, characterized in that, when the sentence reaches the score SS=1, an autotranslation is generated which retrieves the by now single meaning-signal of each word from the database system (1) and in each case retrieves the most common synonym of each word from the database system (1) using the valid meaning-signal and tags each word of the sentence with both information items or with corresponding, machine-readable alternative labels (8).
15. Method according to at least one of No. 1 to 14, characterized in that, when enabling the autotranslation, the user can also retrieve more than the most common of the synonyms of the tagged word with SW=1 from the database system (1), in order then to replace the original word of the sentence with that selected from these other synonyms.
16. Method according to No. 15—named "autotranslation"—characterized in that, if the user marks a sentence with score 1—e.g. with the mouse via his display device—a grammatically correct sentence is automatically formulated from the tagged information of the sentence, in which e.g. the inflectable homonyms of the sentence are replaced by their most common synonyms.
17. Method according to at least one of No. 1 to 16, characterized in that, if the user actively selects a word with SW=1 in a sentence with sentence score SS=1—e.g. by double-clicking with the mouse via his display device—from the tagged information of the sentence the most common synonym of the selected word—in the present context—is automatically displayed.
18. Method according to at least one of the previous No. 1 to 17, characterized in that, for words of the text in sentences whose score SW is not equal to 1, they are re-tagged with the existing information for the respective word from autotranslation storage (5) or the error-message-storage (4) via the User Interaction Manager (7), whenever the information for the respective word is changed in both these memories.
19. Method according to at least one of No. 1 to 18, characterized in that, all information from preceding sentences which is necessary for the analyzed sentence to obtain a score SS=1 for the sentence, are tagged for subsequent further processing.
20. Method according to No 19, characterized in that all corrections of the sentence for words with SW not equal to 1 are carried out automatically, provided the correction of the word has only 1 valid possibility in the modulator 1 or error memory (4).
21. Method according to at least No. 19 or 20, characterized in that all messages generated during the processing of the sentence and not according to No. 20 can be deleted automatically, are tagged on the sentence in off-line mode and the method continues with the next sentence with status sentence score SS="unknown".
22. Computer-implemented machine translation system for translating sentences of one natural language into another, by using "meaning-checking" according to at least No. 1 to No. 21.
23. Method according to No. 22, characterized in that, a sentence with score SS=1 is automatically acquired, or the text is processed according to No. 1 until at least 1 sentence with sentence score=1 exists, or there are no unprocessed sentences left.
24. Method according to at least No. 22 or 23, characterized in that, the text is translated into the selected target language of the user, taking into account the pre-designed, univocal meaning-signals of all words and all additional information with which they are each tagged.
   Use for this purpose of the database of the database system (1) which contains all meaning-signals, and associated therewith, the correct translations of all words in the source and target language in conjunction with their valid meaning-signals in all inflections in the source and target language.
25. Method according to at least one of No. 1 to 24, characterized in that, language-pair-specific rules of the database system (1) are applied, which by adjustment of the order of the words in relation to their morphology and inflection, and of the order of the sentence constituents from No. 7 in memory (6), places the sentence in the target language in an order that is semantically, morphologically, grammatically and syntactically correct in the target language. In doing so, particular account is taken of e.g. the tagged sentence structure of the source language from No. 7, which in a language-pair-specific manner also specifies the correct, new order of the sentence parts in the target language.

26. Computer-implemented processing of texts originating from automatic speech recognition of a natural language, according to the prior art, using “meaning-checking” according to at least one of No. 1 to 21, characterized by:

27. Method according to No. 24, characterized in that, text with sentences from a speech recognition system according to the prior art is acquired automatically.

28. Method according to No. 26 or 27, characterized in that, a calculation is performed of the existence of homophones in a sentence by comparison of the words of the sentence against the known homophone groups in the natural language of the user from the database of the database system (1).

29. Method according to at least one of No. 24 to 28, characterized in that, all possible sentence variants are generated by sequential, reciprocal replacement/substitution of the relevant homophone variants in the sentence.

30. Method according to No. 29, characterized in that, each sentence is evaluated according to at least one of the methods according to No. 1 to 22 and is tagged in off-line mode with messages from the autotranslation storage (5) or the error-message-storage (4).

31. Method according to No. 30, characterized in that, the sentence scores of all generated sentences are evaluated and, if only one single sentence of all of them has the score SS=1, this sentence is utilized as a result and tagged in accordance with No. 14.

32. Method according to No. 31, characterized in that, the sentence scores of all generated sentences are evaluated, and if more than 1 sentence has a score=1, the one with the highest arithmetic match of all homophones is taken.

33. Method according to at least one of No. 1 to 32, characterized in that, if no unique decision is possible because none of the sentences has a score SS=1, the input sentence is tagged with the information on the analyzed homophones, the messages from the autotranslation storage (5) or the error-message-storage (6).

The advantage of this variant with respect to the state of the art is:

speech recognition according to the prior art cannot recognize homophones, or upper/lower case spelling. By the procedure shown in No. 26, in all known homophones of a natural language that are recorded in the database of the database system (1) (e.g. approx. 1,000 in German and in some cases very frequent ones, such as er/eher, ist/isst, jäh/je, sie/sieh, Feld/fällt, etc. In other languages 10,000—English, up to 25,000—Japanese), the correct spellings in the sentence context are identified via their meaning-signals. This reduces training costs for operating the software and increases the quality of the recognized text considerably.

34. Computer-implemented processing/reconstruction of garbled texts, e.g. from automatic speech recognition of a natural language in the presence of background noise, according to the prior art, with spelling errors but no completely missing words using “meaning-checking” as claimed in at least one of claims 1 to 21.

35. Method according to No. 34, characterized in that, in an automatically acquired text the possibilities of rewording the sentence are determined systematically by the correct spelling of incorrect words. This can be effected, for example, by “sounds-like” methods or similar search algorithms on the basis of data from the database system (1). Firstly with the priority on words that are similar to homophone groups, or that correspond to omissions of letters or typical typing errors when operating a keyboard, including upper/lower case, accenting, etc.

36. Method according to No. 34, characterized in that, with the facilities provided in No. 35 it is investigated whether sentences with a sentence score SS=1 are produced.

37. Method according to at least one of No. 34 to 36, characterized in that, the procedure is terminated if no usable hits can be identified after a user-specified time—e.g. 5 seconds–(scale=approx. 500 . . . 1000 attempts per second).

38. Method according to at least one of No. 34 to 37, characterized in that, the input sentence is tagged with the information of the analyzed homophones, the messages from the autotranslation storage (5) or the error-message-storage (6). If only sentences with a score unequal to 1 exist, those having the fewest words with SW=0 are prioritized for the tagging.

39. Computer-implemented operation of search engines that search in databases, the natural language texts of which are tagged by “meaning-checking” according to at least one of No. 1 to 21 and are indexed based on the tagging.

40. Method according to No. 39, characterized in that an automatic database indexing is carried out based on the meaning-signals of all of its words according to No. 1, before the search process and of all sentences which have a sentence score SS=1 according to at least one No. 1 to 21 and have been tagged accordingly.

41. Method according to at least one of No. 39 or 40, characterized in that, an automatic inclusion of all same-language synonyms in all their valid inflections is included in the search (same meaning-signal as the search word).

42. Method according to at least one of No. 39 to 41, characterized in that, an automatic inclusion of foreign-language synonyms in all their valid inflections is included in the search (same meaning-signal as the search word).

43. Method according to at least one of No. 39 to 42, characterized in that, when using multiple search words, a combination of the meaning-signal hits according to the association logic of the search words is carried out.

The operation of search engines according to the procedure shown in No. 39 to 43, has the enormous advantage that the search only produces hits that correspond to the meaning-signal of the search word. This reduces the number of hits in search engines by more than 99% if the search word is a homonym. In addition, the valid inflections of the search word and all those of its synonyms are also automatically searched for, if required in foreign languages as well. This increases the quality of the search result significantly, especially for business intelligence applications and reduces the reading effort required for the user to select the final hits, in inverse proportion to the quality gain.

44. Computer-implemented evaluation of the relevance of statements in the form of text in natural language to a pre-defined topic according to at least one of No. 1 to 21.

45. Method according to No. 44, characterized in that, in the case of an automatically acquired sentence with sentence score SS=1, the meaning-signals of the words of the sentence with pre-defined combinations or patterns of meaning-signals are automatically composed with words of the comparison topic tagged according to No. 1.

46. Method according to No. 44 or 45, characterized in that, the overlap of the meaning-signals of the topic specification and the input sentence with pre-defined overlap patterns is ranked, taking into account the existence of meaning-signals of logical operators (e.g. "not", "and", "or", etc.) within the sentence structure of the input sentence according to any one of No. 1 to 22.

47. Computer-implemented conduct of automatic dialogs by computers/or "responding computers" with human users, by combining the claims of "meaning-checking" according to No. 26, 34, 39, 04.

48. Method according to No. 47, characterized in that, the spoken input of a user is acquired as text by the responding computer by using No. 26, 34, 39, 04.

49. Method according to No. 47 or 48, characterized in that a breakdown of the input text into individual sentences is carried out by the responding computer, and an automatic evaluation is made as to which of these sentences are statement sentences and which are question sentences, for example by the presence of question marks at the end of the sentence or not, or their typical sentence structure.

50. Method according to at least one of the previous Nos., characterized in that, the meaning-signals of the statement and question sentences of the user are compared according to No. 1, based on their matching/correspondence with a database tagged according to No. 47 of the statement sentences, response sentences and standard question sentences of a machine-readable text ontology of the responding/dialog-participating computer, which exists in the same natural language as the natural language in which the user interacts.

(The scale for the ontology of the responding computer=e.g. 500 accurate sentences of an FAQ-database of a supplied service, e.g. each with sentence score SS=1).

51. Method according to at least one of the previous Nos., characterized in that in the case of matching values of the meaning-signals of the sentences of the user above a certain level, with the computer ontology of the responding computer, the response and statement sentences rated the highest in the matching/correspondence value are identified from the computer ontology.

52. Method according to at least one of the previous Nos., characterized in that, the responding computer generates a structured, automatic response for the user, e.g. according to the pattern:

(a) confirmation of a maximum of the e.g. 2 highest ranking sentences A and B of No. 50 of the user in relation to the computer ontology in spoken form, by the responding computer via a speech output system in accordance with the prior art. (e.g., "If I have understood you correctly, you said the . . . "wording of sentence A" . . . and also the "wording of sentence B"

(b) offering the highest ranking response sentence of the computer ontology according to No. 50 and concluding with the highest ranked response sentence from No. 50 of the responding computer via a speech output system in accordance with the prior art, which only allows the user to make controlled answers on request, e.g. "Yes" or "No".

(c) Alternatively answers with the sending of a link by the responding computer—according to certain rules—which the user receives, in order to read more detailed information on his questions and to be able to put more targeted questions to the responding computer that the user himself might only have found in the computer ontology e.g. after some search effort of his own.

53. Method according to at least one of the previous Nos., characterized in that, in the case of matching values below a certain level, e.g. a standard dialog is called up in the responding computer, to which the user can only answer Yes or No, or by uttering controlled pre-defined, spoken, alphanumeric options.

54. Method according to at least one of the previous Nos., characterized in that, an automatic detection is carried out in the responding computer of the moment from which the intervention of a human being is needed, e.g. by automatic evaluation of the redundancy of the dialog or content-based patterns of meaning-signals in the responses of the user.

It should be noted that the enormous flexibility of No. 47 in comparison to the prior art, which it obtains due to the fact that meaning-signals according to at least one of No. 1 to 21 are used:

The user can speak relatively freely (restrictions are only the number of different meaning-signals and their sentence-wise combinations that are included in the computer ontology).

The recognition rate in the computer ontology due to working with meaning-signals is high and accurate, without the large amount of programming overhead which is tedious, being nowadays restricted to specifying particular single words, or is subject to limitations in the permissible types of inflection of the recognized words.

55. Computer-implemented, enhanced spell-checking, by using "meaning-checking" according to at least one of No. 1 to 22.

56. Method according to No. 55, characterized in that, the automatic execution of at least one of No. 1 to 22 is carried out but without the sentence itself being tagged with the meaning-signals, after having reached a sentence score>0. The text is therefore only checked for spelling errors and corrected interactively by the user, but without necessarily any tagging of the sentence with additional information taking place.

57. Computer-implemented word recognition during typing of words on keyboards which may contain multiply assigned keys, by using "meaning-checking" according to at least one of No. 1 to 21.

58. Method according to No. 57, characterized in that the text is automatically acquired from a subordinate system, such as a user's smart phone, with word recognition according to the prior art, tagged with the log file of each of the activated e.g. key sequences that were used to enter each word in the sentence.

59. Method according to No. 57 or 58, characterized in that the e.g. key signals are acquired directly without a selection of words taking place in advance using another system.

60. Method according to at least one of No. 57 to 59, characterized in that, a check of the existing input is carried out according to at least one of No. 1 to 22, and with the aid of the key sequence from the log file of the combinations of keys pressed and key assignments, it is calculated whether other hits of words are present in the database of the database system (1) for the key combination of the word whose meaning score in relation to the existing words of the sentence have a better rating than the existing ones in terms of spelling, syntax and meaning-signal matching.

61. Method according to at least one of No. 57 to 60, characterized in that, suggestions for improvement of his existing text in terms of spelling, inflection and syntax of the already existing text are offered to the user for acceptance.

62. Method according to at least one of No. 57 to 61, characterized in that, an automatic correction of typing errors is carried out during the text input, identifiable as letter sequences which are not included as word beginning in the database of the database system (1), but which become so following a change in the letter order upper/lower case, e.g. according to typical typing error patterns, while simultaneously taking into account the meaning-signal matching and the syntax relative to already existing words of the sentence.
63. Method according to at least one of No. 57 to 62, characterized in that, matching words are suggested, e.g. during the input of the text, as soon as only one single, or less than "n" possibilities exist for the word which are no more than "m" % longer than the current word, where "n">=1; "m"<75%, and which e.g. also have a high matching value to other already existing words of the sentence in terms of their meaning-signals.
64. Method according to at least one of No. 57 to 63, characterized in that, suggestions or options for the word currently being written are displayed visually on the user's display device, e.g. above the word currently being written, in semi-transparent mode.
65. Method according to at least one of No. 57 to 64, characterized in that, the text is produced via a speech recognition system according to No. 26 or No. 34.
66. Computer-implemented system for the semantic encryption of sentences of a natural language, using "meaning-checking" according to at least one of No. 1 to 21.
67. Method according to No. 66, characterized in that, text is read in, the sentences of which do not necessarily have a sentence score of 1, but each of which contains at least 3 words with status SW>0.
68. Method according to No. 66 or 67, characterized in that, "m" words in each sentence are replaced in a grammatically well-formed manner, or "n" words are added in a grammatically well-formed manner, which have suitable meaning-signals compared to their immediate environment, which indicate that, e.g. by insertion, negation, relativization or omission or by use of antonyms thereof from the database of the database system (1), the sentence meaning can be changed significantly but without the sentence score being changed. "m">=1 or "n">=0.
69. Method according to at least one of No. 66 to 68, characterized in that, all alphanumeric chains are proper names and/or dates and/or pure numbers which have their own meaning-signals, or single words marked in advance particularly by the user are replaced by coded number combinations, each of which is not repeated in its entirety throughout the entire text.
70. Method according to at least one of No. 67 to 69, characterized in that the user's starting sentences are stored on the user's system taking account of the original order, and a log file is stored of all changes that were created as variants, including for each change at least a specification of the content of the change and position in the respective sentence.
71. Method according to at least one of No. 67 to 70, which assists the user to identify sentences from other text databases in his possession than the current text itself, which are similar to the sentences in the input text to be encrypted, for example, by the application of No. 44, and that have a sentence score SS=1.
72. Method according to at least one of No. 67 to 71, characterized in that, the number of sentences of the text is increased to at least 7 if over the input text plus variants according to No. 68, there are less than 7 sentences to be encrypted. This can occur advantageously, e.g. due to sentences which are determined using No. 71.
73. Method according to at least one of No. 67 to 72, characterized in that, a text is created which contains the user's starting sentences, plus "m" appended sentences which are variants of his created according to No. 68, that is anonymized according to No. 69.
74. Method according to at least one of No. 67 to 73, characterized in that a stochastic scrambling of the sequence of the existing sentences is carried out and the addition of the explicit modification of sequence before and after the scrambling to the log file of No 70.
75. Method according to at least one of No. 67 to 74, characterized in that if the unchanged, but scrambled text from No. 73 and the log file from No. 70 are present, the original text is reconstructed flawlessly.

In the semantically encrypted text—which does not also contain a single, formally more meaningless sentence, in comparison to those which the user has written himself—the original starting sequence of the sentences of the user is now identifiable only with enormous effort by manual reading. E.g. for 10 starting sentences and 10 additional sentence variants, the original sequence is only 1 possibility among the permutations of 20, i.e. $20!=2.4329*10^{18}$, i.e. approximately 1:2.5 trillion possibilities.

However, each recipient of the text can only restore the starting sentences easily with the information from the log file of the author of the text.

No. 65 can also be used particularly advantageously as an enhancement to standard commercial encryption systems.

If the code of the commercial encryption is cracked, whoever did it would face a practically insoluble time problem due to the amount of sentences to be manually analyzed, in order to determine the true meaning of the whole text, from which moreover all information referring to people, dates and numbers is missing, information which also includes modified quantifiers and logical operators as compared to the original text.

Here the only remaining risk is the secure transmission of the code for the starting sequence according to at least one of the previous claims, in addition to the secure transmission of the standard commercial encryption code.

Even with the application of our own method according to No. 1 no decryption would be possible, since only sentences with a univocality level similar to the univocality level of the original text are present in the scrambled text.

The invention claimed is:

1. A method of machine translation for automatically detecting meaning-patterns in a text that includes a plurality of input words of at least one sentence using a database system that includes, stored a table of words versus meaning signal categories/sense properties, words of a language, a plurality of pre-defined categories of meaning describing sense properties of the words, and meaning-signals for all the words, wherein each meaning-signal is a univocal numerical characterization between one of the words and a category of meaning associated with said word, wherein the method comprises:

a) reading of the text with input words into a device for data entry, from a means for data input, linked to a device for data processing, b) comparison, by the device for data processing, of the input words with the words in the table of words vs. meaning signal categories/sense properties stored in the database system that is connected directly and/or via remote data line to the device for data processing, c) based on the comparison in step b), assignment, by the device for data processing, of at least one meaning-signal from the table to each of the input words, wherein in the case of homonyms two or more meaning-signals are assigned, wherein each meaning signal is assigned to an input word based on the sense property associated with the input word in the table;

d) in the event that the assignment of the meaning-signals to the input words in step c) is univocal, the meaning-pattern identification is complete, and proceed to step g), e) in the event that more than one meaning-signal is assigned to an input word in step c), the device for data processing compares the meaning-signals assigned to the input word with one another in an exclusively context-controlled manner, excluding comparisons of meaning signals to themselves and comparisons of meaning signals that, based on a numerical pattern of the univocal numerical characterization of each meaning signal, do not match semantically, logically, morphologically, or syntactically, and assigns a degree of meaning to each comparison based on a degree of matching semantically, logically, morphologically, or syntactically, f) meaning-signal comparisons that match are automatically numerically evaluated by the device for data processing according to the degree of matching of their meaning-signals and recorded, g) the device for data processing automatically compiles all input words resulting from steps d) and f) into output words in a target language and outputs said output words as the meaning-pattern of the text based on the degree of matching of the meaning-signals in step f), wherein:

after a word meaning score "SW" is calculated by a meaning modulator of the device for data processing for all of the input words of the text, wherein the word meaning score is the number of entries of each word in the database system, coupled with the relevance of the meaning-pattern of each word in the context of the sentence:

if the meaning score "SW" for a word of the sentence is equal to 0 (zero), then the word is spelled incorrectly and the sentence receives a sentence score "SS"=0, if the meaning score "SW" for a word of the sentence is greater than 1, wherein a word with SW>1 has more than one possible meaning in the sentence and its context, then the analyzed sentence is incorrect and/or is not univocally formulated, and the sentence score is then set to "SS"="SW", if more than one word of the sentence has a meaning score "SW">1, then the sentence score "SS" is set to the maximum value "SW" of the meaning scores of the words of said sentence, if all the words of the sentence have a meaning score "SW"=1, then the sentence is univocal and receives the sentence score "SS"=1, if words of the sentence have a meaning score "SW"=−2, then said words allow both upper and lower case spelling, wherein the sentence score "SS" then receives the value "SS"=−2, until a correct upper or lower case spelling of the words with "SW"=−2, in this sentence, is finally determined, if the text originates from speech input and if words have a meaning score "SW" not equal to 1 and belong to a homophone group—identified by device for data processing—then the words receive the meaning score "SW"=−3, and the sentence score "SS" receives the value −3 until the correct homophone of the group in this sentence and its context is finally determined, and if words of the sentence have meaning score "SW">1, then with words of an arbitrary number "v" of preceding or of "n" following sentences of the text it is checked whether the words are included in the preceding or following sentences which, due to the modulation of their meaning-signals, lead to "SW"=1 in the input sentence, wherein for normal speech applications and easily understandable texts, "v"=1 and "n"=0, and (h) in response to user selection of a sentence with a mouse via a display, the device for data processing automatically determines from the sentence a grammatically correct sentence wherein inflectable homonyms are replaced with synonyms.

2. The method as claimed in claim 1, further comprising:

determining, in accordance a pre-defined matching criterion, whether the meaning-pattern for at least one input word of the text has more than one remaining meaning, whereupon no unique meaning-pattern and/or no unique meaning of the sentence exists in the context of the sentence, and outputting the non-uniqueness and its cause to a User Interaction Manager.

3. The method as claimed in claim 1, wherein the text with the input words is a string of characters that originates from written text, from acoustically recorded text via a speech recognition program, photographed text, or OCR.

4. The method as claimed in claim 1, wherein, following step (e), in response to all of the input words of the text being assigned meaning-signals, generating a signal for a degree of univocality of the text.

5. The method as claimed in claim 4, wherein for a word where "SW"=−2, launching an error message which indicates a case error in the spelling of said word, naming said word position in the sentence, the cause of the error, and storing the error, and storing the error message in a storage that is accessible to a User Interaction Manager.

6. The method as claimed in claim 1, further comprising: generating, for each word where SW=0, an error message indicating a spelling error and determining for said word a possibility for eliminating the error that is stored in a storage that is accessible to a User Interaction Manager.

7. The method as claimed in claim 1, wherein in response to no words having SW=0, updating the meaning-signals of a current paragraph on the basis of constraint references associated with words of the current paragraph and storing updated meaning-signals in a storage that is accessible to a User Interaction Manager.

8. The method as claimed in claim 1, wherein for sentences with SS>1, generating an autotranslation message which lists still existing number of SW meaning possibilities of each word and, for each word, retrieve synonyms of said word from the database system on the basis of said word's meaning-signals, and storing the retrieved synonyms in a storage that is accessible to a User Interaction Manager.

9. The method as claimed in claim 1, wherein the sentence is in a natural language which is translated into the target language, wherein a sentence with score SS=1 is automatically acquired, or the text of the sentence is processed until the sentence has a score SS=1.

10. The method as claimed in claim 9, wherein the text of the sentence is translated into the target language, on the basis of univocal meaning-signals of the words of the sentence.

11. The method as claimed in claim 9, further comprising:
on the basis of language-pair-specific rules stored in the database system, adjusting an order of the words in the sentence in relation to their morphology and inflection, and of the order of the sentence constituents;
determining main clauses, dependent clauses, inserted dependent clauses, subjects, predicates, objects, text parts between hyphens, and/or text parts between two brackets (open/closed); and
storing the words in the target language in a storage in an order that is at least as semantically, morphologically, grammatically and syntactically as correct in the target language as in the sentence.

12. The method as claimed in claim 1, wherein the output words in the target language are displayed, or acoustically reproduced.

13. The method as claimed in claim 1, wherein in the presence of at least one word with homophones in the sentence, reviewing a degree of meaning-signal correspondence of the word and all its other homophonous spellings in relation to context, and replacing the word by the homophone with a greatest meaning modulation in the sentence or outputting an error message where there is insufficient computational differentiation among the meaning-signals of words of a homophone group in the context.

14. The method as claimed in claim 1, wherein in response to the sentence including garbled text when at least one word SW=0, automatically and systematically reformulating the sentence by correctly spelling incorrect words, with priority on words that are similar to homophones of said word, or that correspond to omissions of letters, spaces, upper/lower case error(s), and/or accenting.

15. The method as claimed in claim 14, wherein via the meaning-signals of correctable words, determining whether one or more sentences with a SS=1 is/are produced, and if so outputting the one or more sentences, otherwise if no sentence with a SS=1 is identified after a specified time, terminating the step of determining whether one or more sentences with a SS=1 are produced, wherein the sentence including the input words is then tagged with information of the words that were analyzed for correction, and if at least one sentence with a score unequal to 1 exist, the sentence having the fewest words with SW=0 is tagged and stored in a storage accessible to a User Interaction Manager.

16. The method as claimed in claim 15, wherein a textual content of the tagged sentence is determined by meaning-checking the unvocality of the words of the sentence.

17. The method as claimed in claim 16, further comprising: updating the database with the meaning-signals of the words of the database before step (a).

18. The method as claimed in claim 1, further comprising: including all same-language synonyms and all foreign-language synonyms in all their valid inflections in the search.

19. The method as claimed in claim 1, further comprising: combining the meaning-signals of multiple input words.

20. The method as claimed in claim 1, further comprising: determining a relevance of statements in text in a natural language to a written topic on the basis of the meaning-signals of the words of the sentence, wherein pre-defined combinations or patterns of meaning-signals are compared with tagged words of the written topic.

21. The method as claimed in claim 20, further comprising ranking an overlap of the meaning-signals of the written topic and the sentence with pre-defined meaning modulation patterns on the basis of at least one of the following within the structure of the sentence: meaning-signals of logical operators, and/or meaning signals disjunctors, and/or sentential connectors.

22. The method as claimed in claim 1, further comprising: acquiring, by the device for data processing, spoken input of the user as text and processing the text by meaning-checking the unvocality of the words of the text.

23. The method as claimed in claim 22, further comprising: breakdown of the text into individual sentences and determining for each sentence if it is a statement sentence, a question sentence, or an exclamation sentence.

24. The method as claimed in claim 23, further comprising:
comparing meaning-signals of the statement and/or the question sentences based on their matching/correspondence with a database of statement sentences, response sentences, and standard question sentences of a machine-readable text ontology and carrying out at least one of the following steps:
(a) when values of the meaning-signals of the words of the sentence is above a certain level, the response sentence or the statement sentence rated highest in a matching/correspondence value is used;
(b) generating by a speech output system a confirmation of highest ranking individual sentences;
(c) outputting by a speech output system for selection by the user a highest ranking response sentence, wherein the speech output system only allows the user to make controlled answers on request;
(d) receiving from the user, in response to the device for data processing outputting user detectable information, one or more questions on the basis of information obtained by the user in response to the output of detectable information; and
(e) when values of the meaning-signals are below a predetermined level, generating, based on a previous question, a dialog to which the user replies and evaluating: redundancy of the dialog or of content-based patterns in the reply, meaning-signal patterns in a verbal reply of the user during the dialog, and/or visually perceivable replies of the user via a camera.

25. The method as claimed in claim 1, further comprising ,in response to the words of the sentence not being tagged with meaning-signals after the sentence has SS>0, performing spell-checking on the sentence.

26. The method as claimed in claim 1, further comprising during entry of words on a keyboard, recognizing the entered words using meaning-checking, and automatic completion of the words with words from the database system on the basis of a best match with syntax and context at the time of entering the words on the keyboard.

27. The method as claimed in claim 1, wherein, for encryption of one or more input sentences of a natural language using meaning - checking the univocality of the sentence,
in each input sentence, “m” words are replaced in a grammatically/semantically well-formed manner with words from the database system, and/or “n” words are added in a grammatically/semantically well-formed manner with words from the database system which have meaning-signals related to their immediate, contextual environment, whereupon by insertion, negation, relativization, or omission and/or by use of antonyms of the “m” and/or “n” words from the database system the sentence meaning can be changed, but without the sentence score being changed, whereupon the sentence is no less semantically/factually meaningful than the sentence from which it is produced, with "m">=1 or "n">=0, and wherein at least one of the following steps is carried out:

a) all alphanumeric chains which are proper names and/or dates and/or pure numbers which have their own meaning-signals, or to which automatically matching meaning-signals can be assigned, and/or selected single words are each replaced by coded, anonymized words, to which shortened meaning-signals, appropriate to a degree of anonymization, are added, b) each input sentence is stored taking account of the original order, and a log file is stored of all changes that were created as sentence variants or anonymizations, wherein each change and derivable content of the change and the position in the respective sentence are recorded, c) identifying in a database, sentences that are semantically—but not logically—similar to each input sentence to be encrypted, and that has a sentence score SS=1, d) the number of sentences of the original text of one or more input sentences is increased to at least 7 if, over said text plus sentence variants, there are less than 7 input sentences to be encrypted, e) text is created which contains the one or more input sentences, plus "m" appended sentences which are automatically created variants of the one or more input sentences, f) scrambling a sequence of at least two of the input sentences and appending information regarding modification of the sequence before and after the scrambling to a log file, and unscrambling the scrambled sentence on the basis of the information regarding modification of sequence stored in the log file, and g) queries of encrypted text are tagged on individual words and/or sentences in such a way that, after reconstruction of the input text translation queries, error messages and/or semantic information of the sentences are automatically cancel whereupon context-related information which due to the scrambling are initially no longer in context, are reconstructed in the input text.

28. A method of machine translation for automatically detecting meaning-patterns in a text that includes a plurality of input words of at least one sentence using a database system that includes, stored a table of words versus meaning signal categories/sense properties, words of a language, a plurality of pre-defined categories of meaning describing sense properties of the words, and meaning-signals for all the words, wherein each meaning-signal is a univocal numerical characterization between one of the words and a category of meaning associated with said word, wherein the method comprises:

a) reading of the text with input words into a device for data entry, from a means for data input, linked to a device for data processing, b) comparison, by the device for data processing, of the input words with the words in the table of words vs. meaning signal categories/sense properties stored in the database system that is connected directly and/or via remote data line to the device for data processing, c) based on the comparison in step b), assignment, by the device for data processing, of at least one meaning-signal from the table to each of the input words, wherein in the case of homonyms two or more meaning-signals are assigned, wherein each meaning signal is assigned to an input word based on the sense property associated with the input word in the table;

d) in the event that the assignment of the meaning-signals to the input words in step c) is univocal, the meaning-pattern identification is complete, and proceed to step g), e) in the event that more than one meaning-signal is assigned to an input word in step c), the device for data processing compares the meaning-signals assigned to the input word with one another in an exclusively context-controlled manner, excluding comparisons of meaning signals to themselves and comparisons of meaning signals that, based on a numerical pattern of the univocal numerical characterization of each meaning signal, do not match semantically, logically, morphologically, or syntactically, and assigns a degree of meaning to each comparison based on a degree of matching semantically, logically, morphologically, or syntactically, f) meaning-signal comparisons that match are automatically numerically evaluated by the device for data processing according to the degree of matching of their meaning-signals and recorded, g) the device for data processing automatically compiles all input words resulting from steps d) and f) into output words in a target language and outputs said output words as the meaning-pattern of the text based on the degree of matching of the meaning-signals in step f), wherein:

after a word meaning score "SW" is calculated by a meaning modulator of the device for data processing for all of the input words of the text, wherein the word meaning score is the number of entries of each word in the database system, coupled with the relevance of the meaning-pattern of each word in the context of the sentence:

if the meaning score "SW" for a word of the sentence is equal to 0 (zero), then the word is spelled incorrectly and the sentence receives a sentence score "SS"=0, if the meaning score "SW" for a word of the sentence is greater than 1, wherein a word with SW>1 has more than one possible meaning in the sentence and its context, then the analyzed sentence is incorrect and/or is not univocally formulated, and the sentence score is then set to "SS"="SW", if more than one word of the sentence has a meaning score "SW">1, then the sentence score "SS" is set to the maximum value "SW" of the meaning scores of the words of said sentence, if all the words of the sentence have a meaning score "SW"=1, then the sentence is univocal and receives the sentence score "SS"=1, if words of the sentence have a meaning score "SW"=−2, then said words allow both upper and lower case spelling, wherein the sentence score "SS" then receives the value "SS"=−2, until a correct upper or lower case spelling of the words with "SW"=−2, in this sentence, is finally determined, if the text originates from speech input and if words have a meaning score "SW" not equal to 1 and belong to a homophone group—identified by device for data processing—then the words receive the meaning score "SW"=−3, and the sentence score "SS" receives the value −3 until the correct homophone of the group in this sentence and its context is finally determined, and if words of the sentence have meaning score "SW">1, then with words of an arbitrary number "v" of preceding or of "n" following sentences of the text it is checked whether the words are included in the preceding or following sentences which, due to the modulation of their meaning-signals, lead to "SW"=1 in the input sentence, wherein for normal speech applications and easily understandable texts, "v"=1 and "n"=0, and (h) in response to user selection of a word with a mouse via a display, the device for data processing automatically displaying on the display device a synonym of said selected word.

* * * * *